Dec. 30, 1924.

B. M. W. HANSON
METAL WORKING MACHINE
Filed Oct. 6, 1921

Inventor
Bengt M. W. Hanson
by T. Hay Lindsey
His Attorney

Dec. 30, 1924.

B. M. W. HANSON

METAL WORKING MACHINE

Filed Oct. 6, 1921

Inventor
Bengt M. W. Hanson
by T. Clay Lindsey
His Attorney

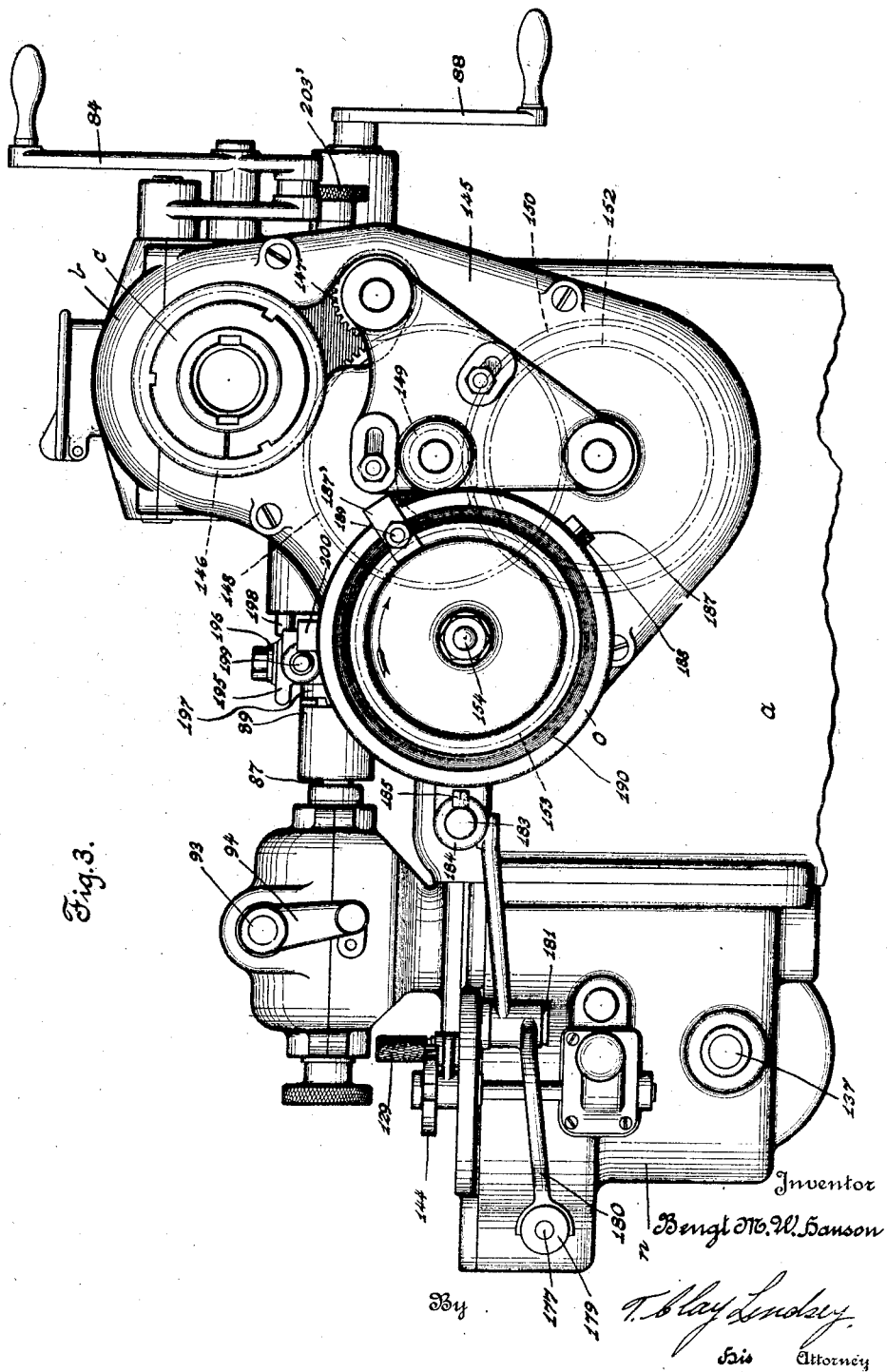

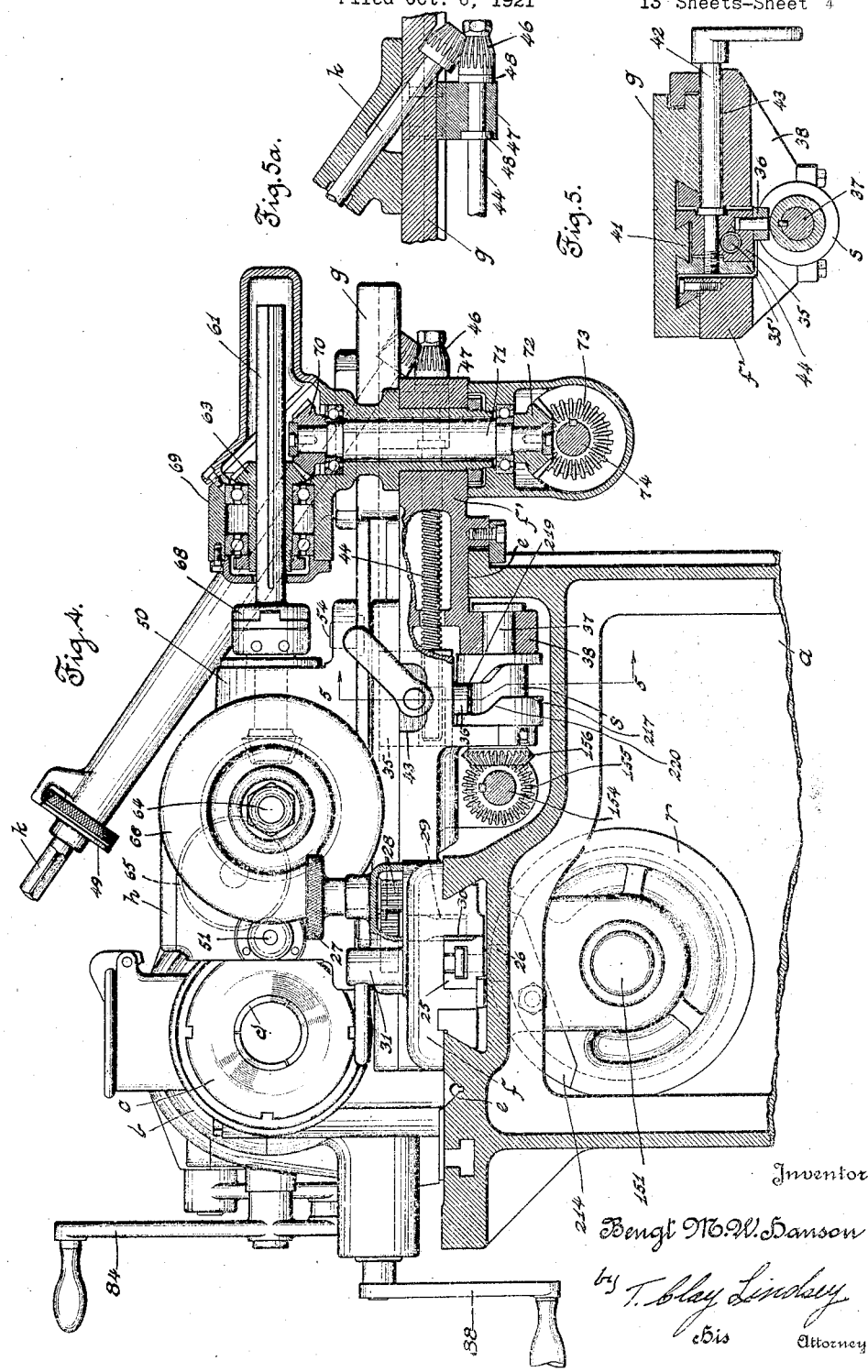

Dec. 30, 1924.
B. M. W. HANSON
1,520,712
METAL WORKING MACHINE
Filed Oct. 6, 1921
13 Sheets-Sheet 5
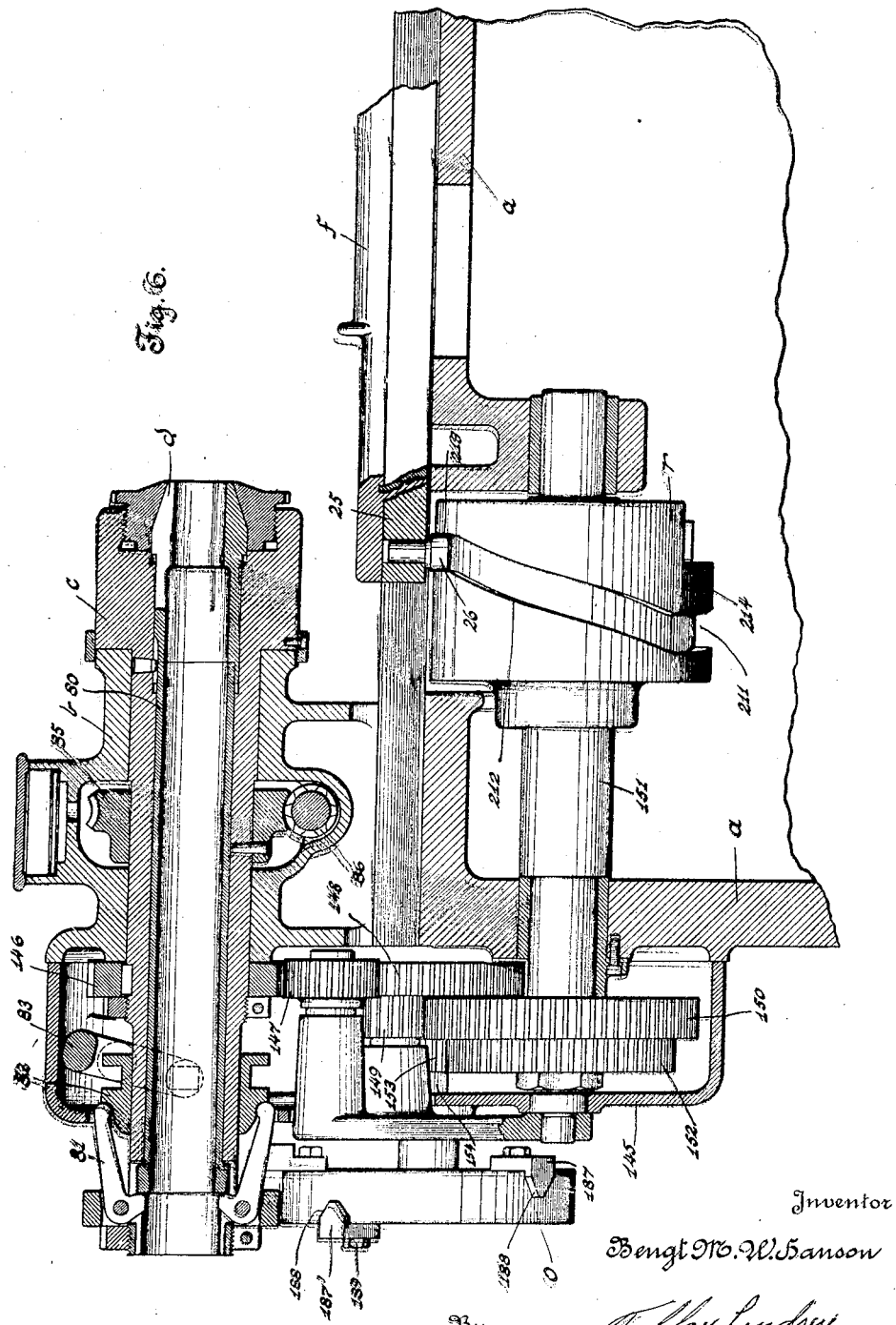
Inventor
Bengt M. W. Hanson
By T. Clay Lindsey
His Attorney

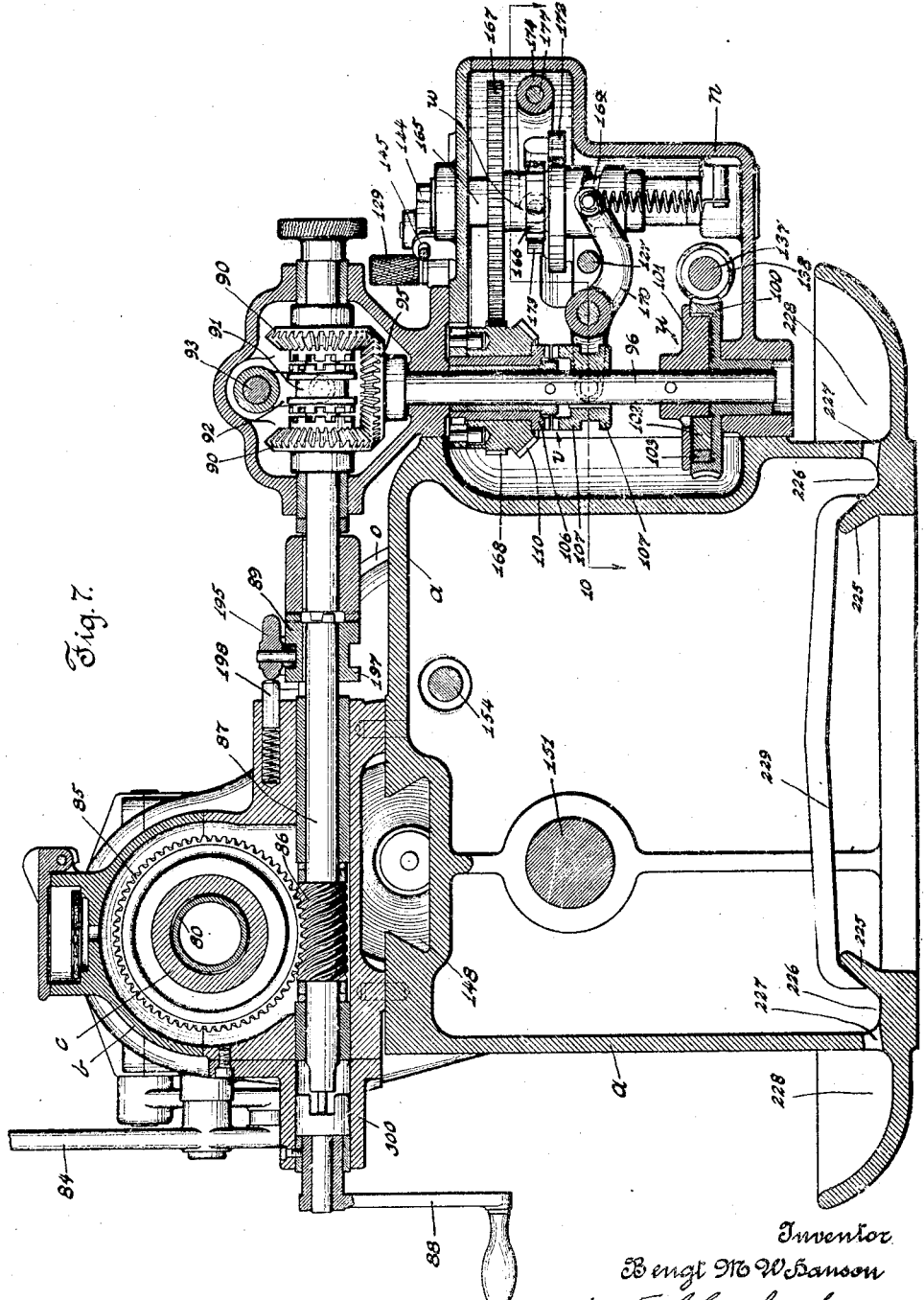

Dec. 30, 1924.
1,520,712

B. M. W. HANSON
METAL WORKING MACHINE
Filed Oct. 6, 1921
13 Sheets-Sheet 7

Inventor
Bengt M. W. Hanson
by T. Clay Lindsey
His Attorney

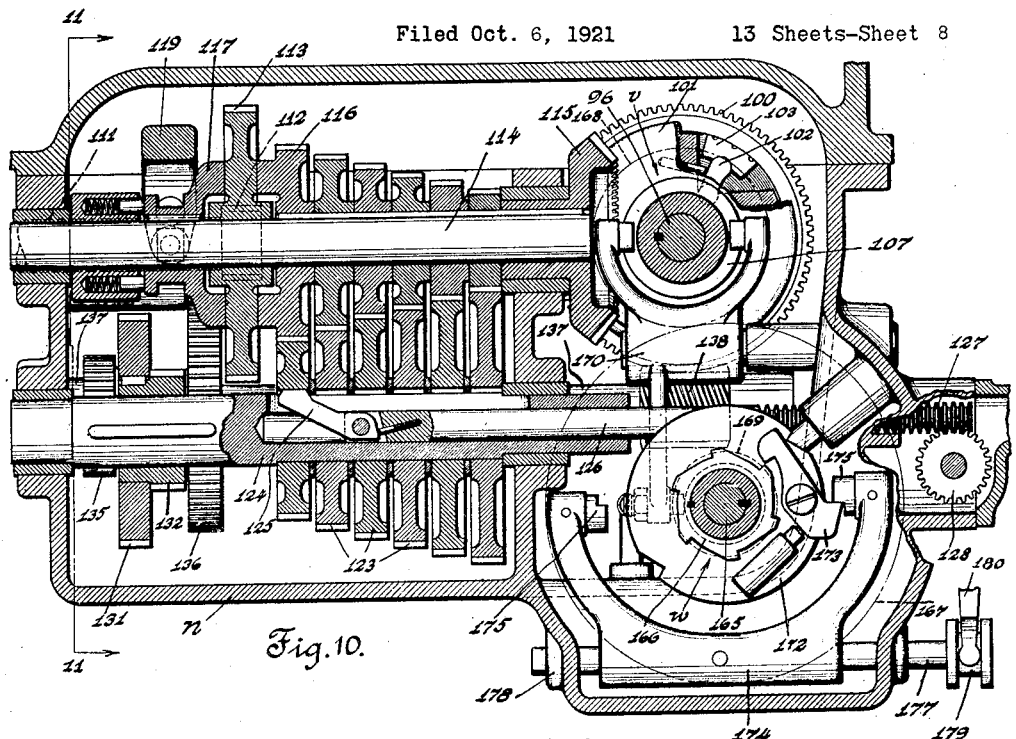

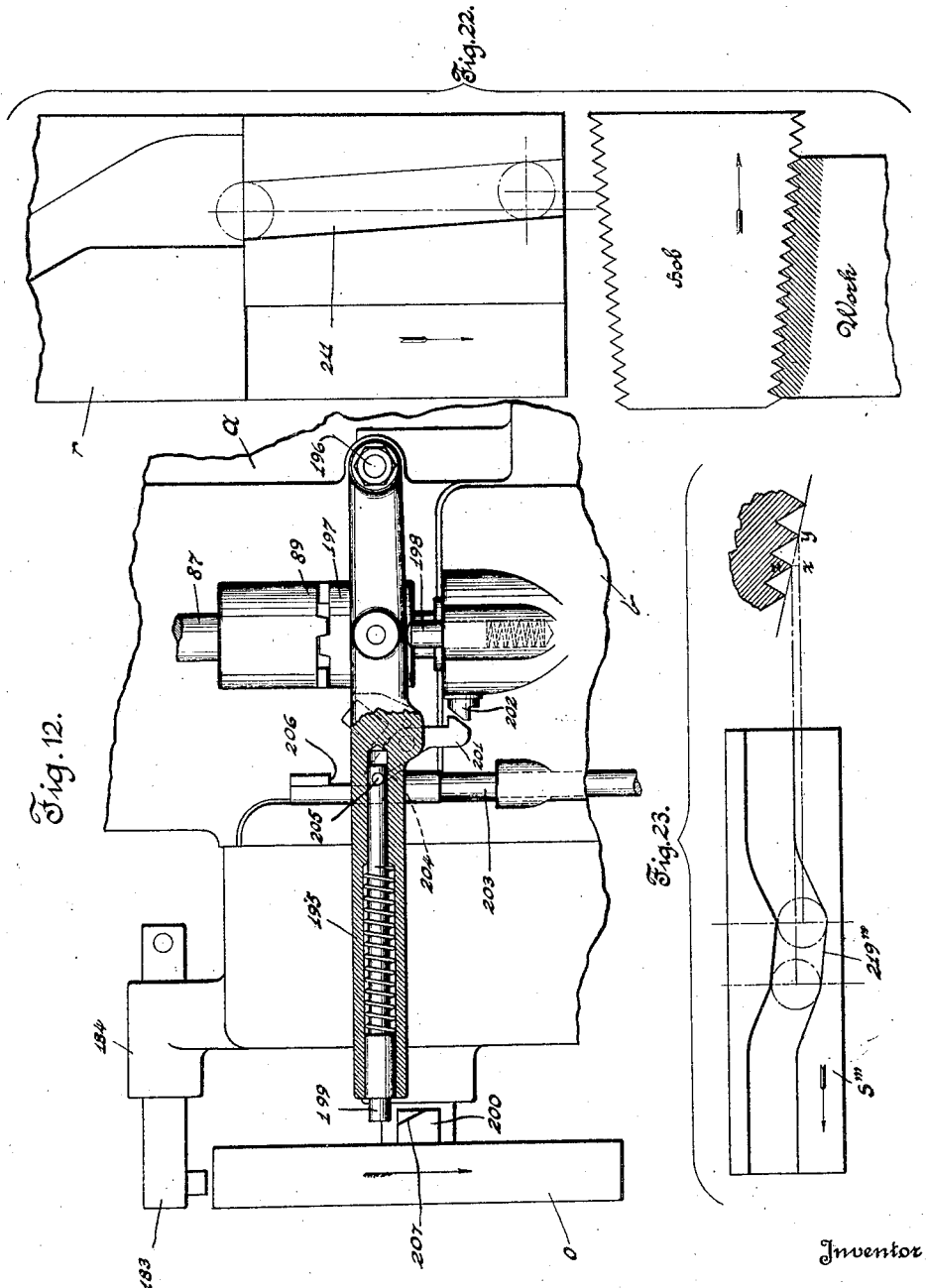

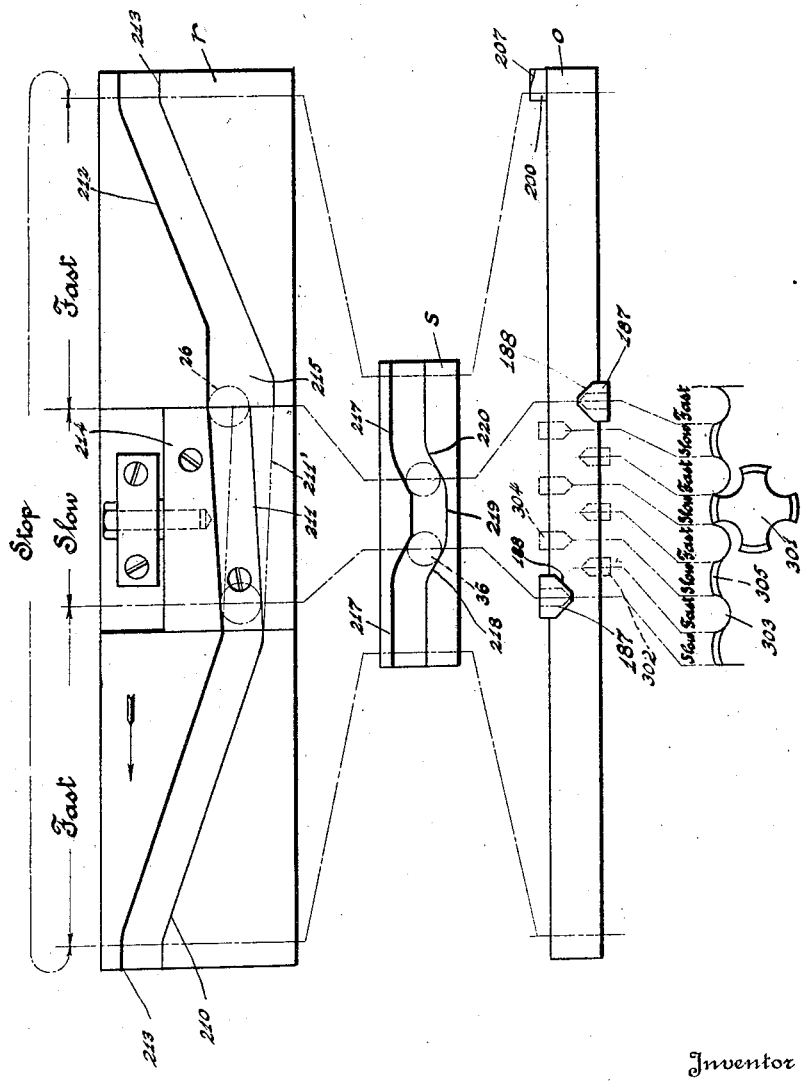

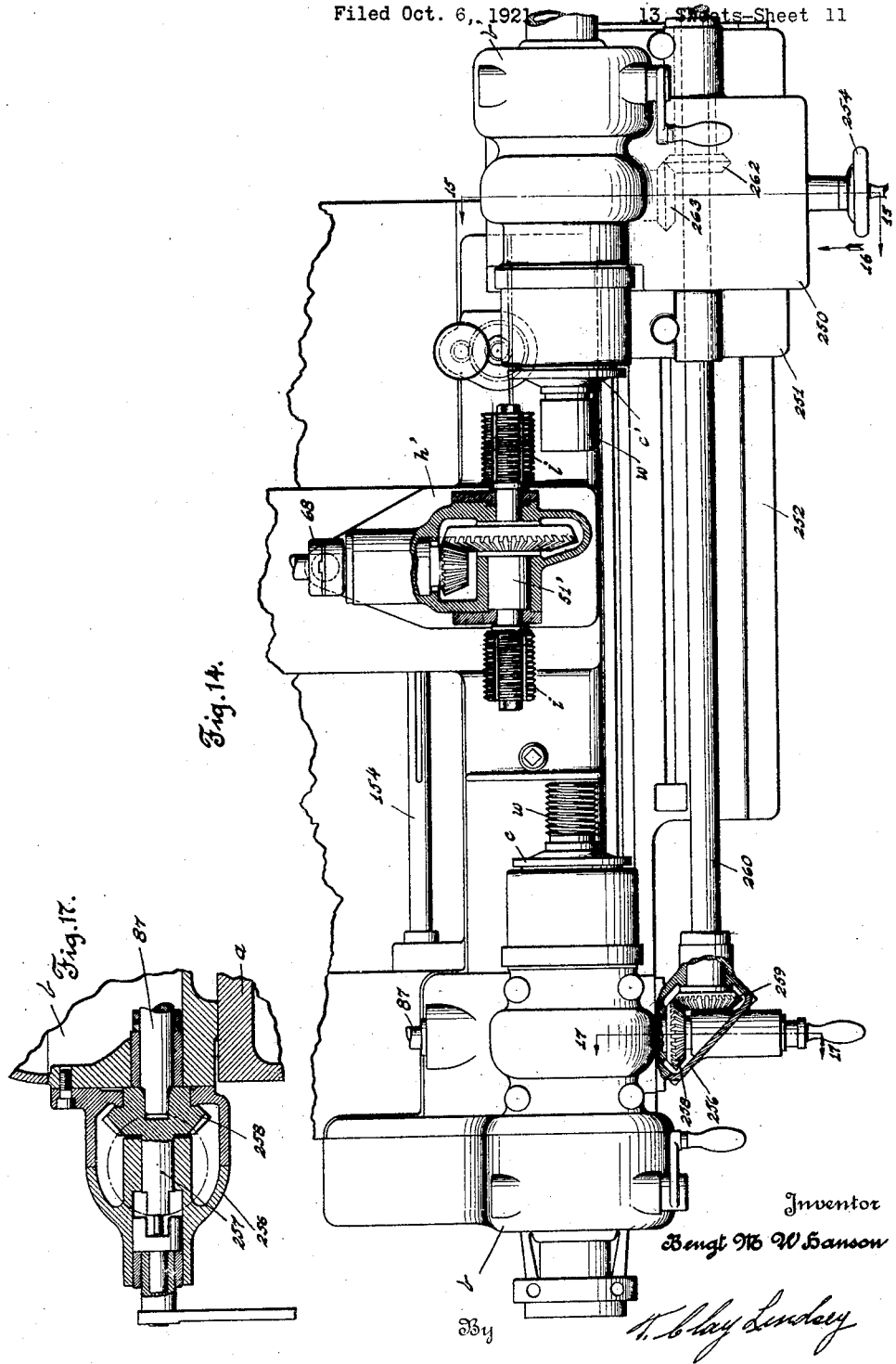

Dec. 30, 1924.

B. M. W. HANSON

METAL WORKING MACHINE

Filed Oct. 6, 1921

Inventor
Bengt M.W. Hanson

By T. Clay Lindsey
His Attorney

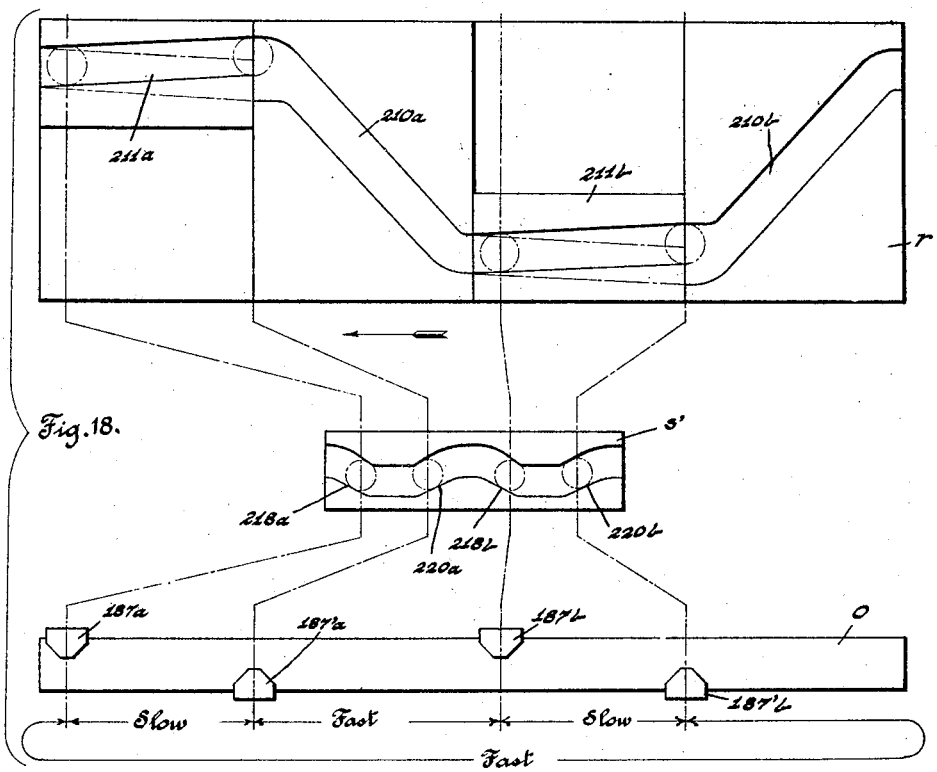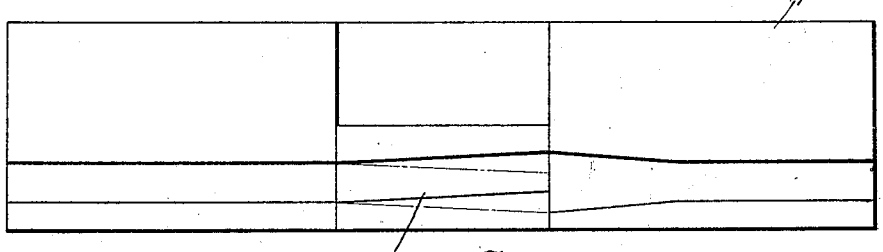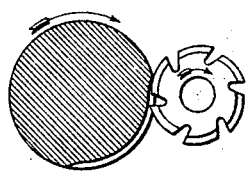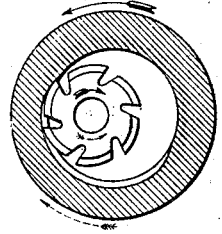

Patented Dec. 30, 1924.

1,520,712

UNITED STATES PATENT OFFICE.

BENGT M. W. HANSON, OF HARTFORD, CONNECTICUT.

METAL-WORKING MACHINE.

Application filed October 6, 1921. Serial No. 505,864.

*To all whom it may concern:*

Be it known that I, BENGT M. W. HANSON, a citizen of the United States, and a resident of Hartford, county of Hartford, State of Connecticut, have invented certain new and useful Improvements in a Metal-Working Machine, of which the following is a specification.

This invention relates to improvements in metal working machines. The various features of the present invention will be described with reference to their use in the particular machine here selected for the purpose of illustration and which is a machine for threading cylindrical members.

The object of the invention is to provide a machine of the character described having various features of novelty and advantage and which is particularly characterized by its accuracy and efficiency in operation. In accordance with this invention, provisions are made for accurately setting and adjusting the members relative to one another and automatically controlling the movements thereof so that they may perform their various functions with precision and expedition.

The present machine is peculiarly adapted for use in threading cylindrical members and as applied to this use has a very wide and universal application in that either external or internal threads may be formed on various sizes of work of different materials with facility and accuracy. If desired, the machine may be readily adjusted to operate first on one piece of work carried by one spindle and then a second piece of work carried by another spindle, or to operate on the work carried by both of these spindles simultaneously.

I desire it to be clearly understood that the present disclosure is by way of exemplification only, that the invention is susceptible of various embodiments and modifications, and that the terms here used are merely terms of description and not in any sense terms of limitation. It will further be obvious that many features of the construction are susceptible of modification to suit different requirements without departing from the spirit of the invention.

In the accompanying drawings:—

Figure 1:
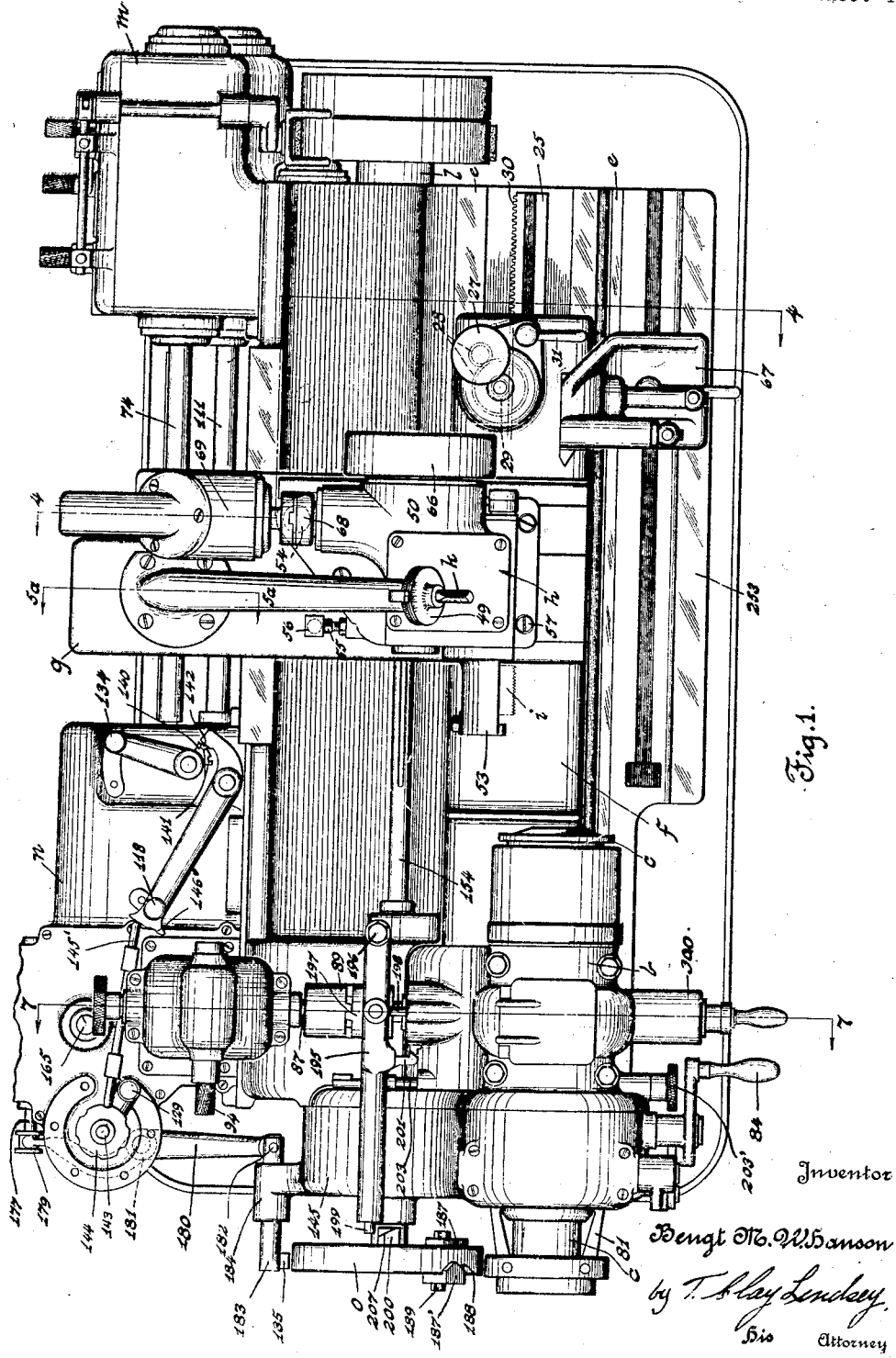
Fig. 1 is a top plan view of the entire machine.
Figure 8:
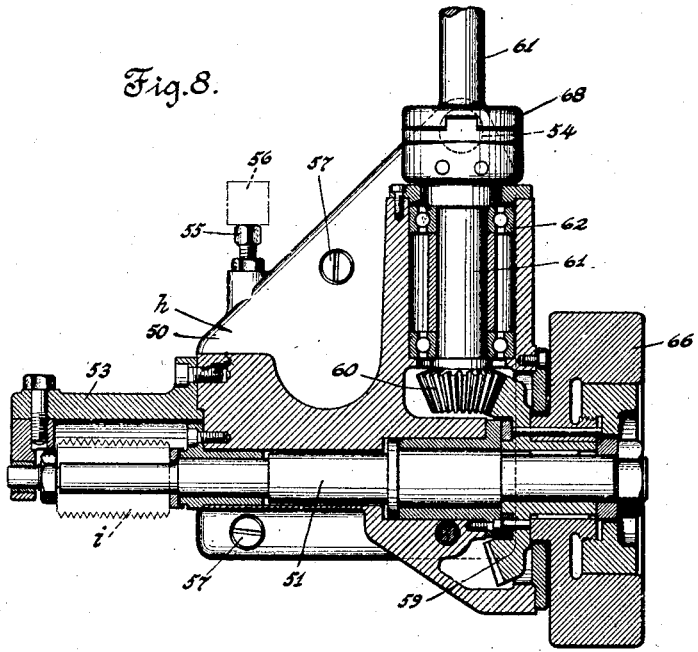
Figure 9:
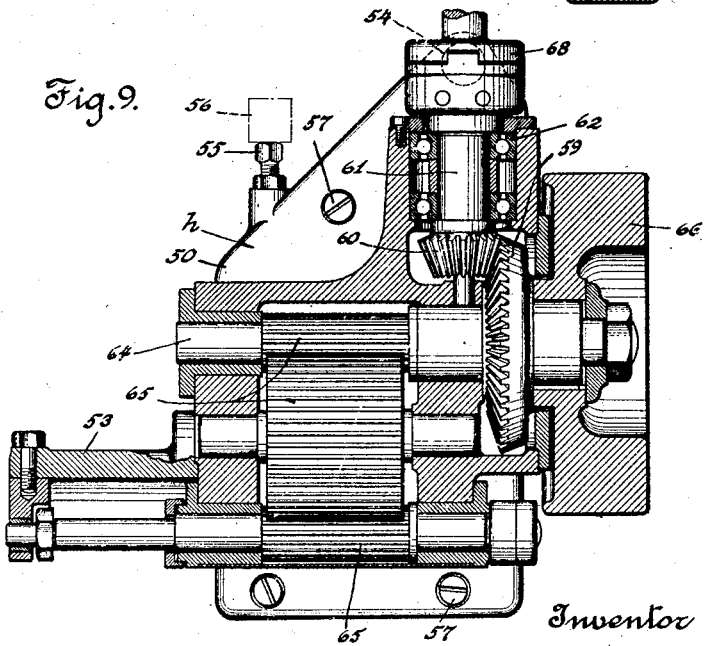

Fig. 3 is a partial view in elevation of that end of the machine which carries the tappet wheel for controlling the movements of certain of the parts, Fig. 4 is a sectional view taken substantially on line 4—4 of Fig. 1 and looking in the direction of the arrows, Fig. 5 is a detail view taken substantially on line 5—5 of Fig. 4, Fig. 5$^a$ is a detail view taken substantially on line 5$^a$—5$^a$ of Fig. 1, and illustrates the manner in which the adjusting screw for the cross slide is fixed against longitudinal movement relative thereto, Fig. 6 is a view taken longitudinally and centrally through the work spindle, Fig. 7 is a section taken substantially on line 7—7 Fig. 1 and shows, in part, the mechanism through which the work spindle is rotated, Fig. 8 is a view in horizontal section of one form of a tool head, Fig. 9 is a view similar to Fig. 8 but shows a slightly different construction, Fig. 10 is a view in horizontal section taken substantially on lines 10—10 of Figs. 7 and 11, and shows, in part, the mechanism through which the work spindle and other parts of the machine are driven and controlled.

Figure 15:
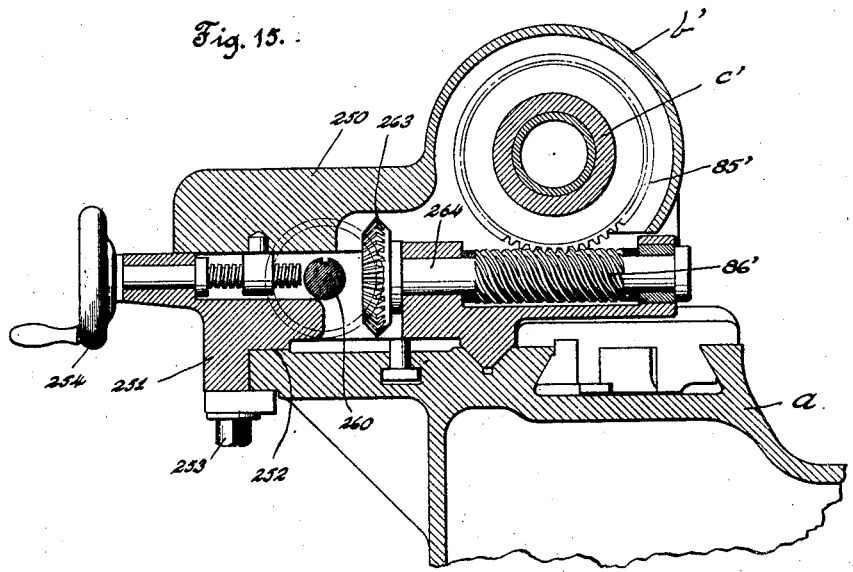
Figure 16:
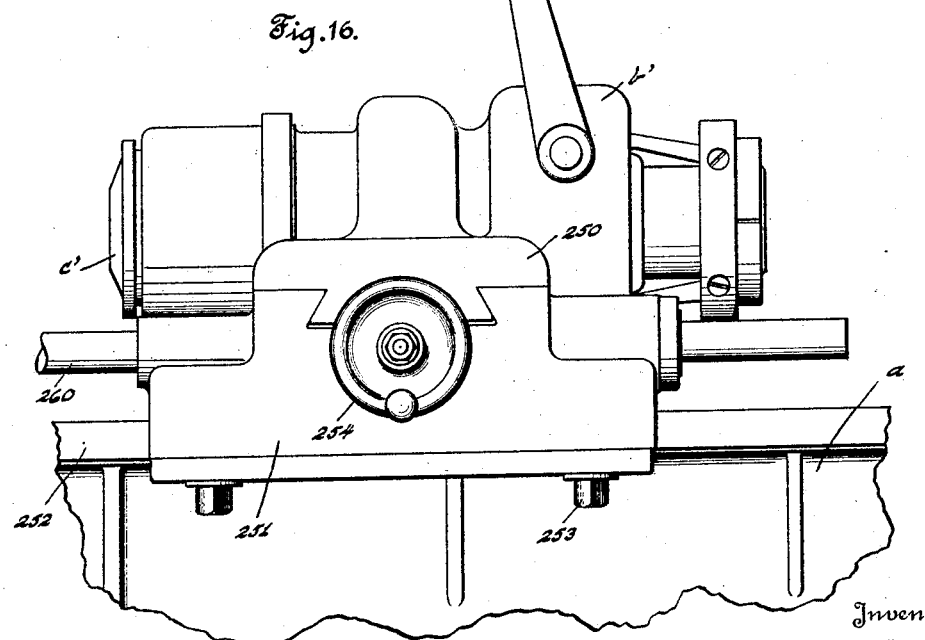

Fig. 11 is a transverse section taken on line 11—11 of Fig. 10,

Fig. 12 is an enlarged detail view of the mechanism for disconnecting and connecting the work spindle to the driving mechanism, Fig. 13 is a view showing diagrammatically the relation of the tappet wheel and the cams used where a single work spindle is employed, Fig. 14 is a plan view showing the machine equipped with a pair of work spindles, Fig. 15 is a vertical sectional view taken on line 15—15 of Fig. 14, Fig. 16 is a front view, that is looking in the direction of the arrow 16 of Fig. 14, of the adjustable work spindle, Fig. 17 is a vertical sectional view taken on line 17—17 of Fig. 14, Fig. 18 is a view similar to Fig. 13, but shows the arrangement and relation of the tappet wheel and cams where two work spindles and two tools are employed and the tools are adapted to alternately cooperate with the respective pieces of work carried by the spindles, Fig. 19 is a view showing the construction of the cam for moving the tool carriage longitudinally where the tools are to operate simultaneously upon the respective pieces of work carried by the two spindles, Figs. 20 and 21 show the direction of rotation of the tool and spindles for internal and external threading, respectively, Fig. 22 is a view showing the extent to which a tapered hob is moved longitudinally by the pitch portion of the cam $r$ to cut a taper thread, Fig. 23 is an exaggerated view showing diagrammatically the extent to which the tapered hob is moved radially into the work during the cutting operation by the cam $s$.

As hereinafter described more in detail, the machine here selected for illustrative purposes is provided with two work spindles, one of which is removable so that the machine may be operated with but one work spindle or with both work spindles, as desired. For convenience in description, the arrangement and construction of the parts and the operation of the machine will first be taken up where a single spindle is employed. Then the machine will be described where both of the spindles are used.

Referring to Figures 1 to 7, the general arrangement and organization of the principal parts of the machine can be easily seen. $a$ is a pedestal or base of any suitable construction on one end of which is mounted a fixed housing $b$ rotatably supporting a work spindle $c$ (see Fig. 6) provided with a collet mechanism $d$ for holding the work. Slidably mounted upon ways $e$ extending longitudinally of the base is a tool carrier or movable support comprising a main carriage $f$ of somewhat T-shape and a cross slide $g$ mounted for reciprocation on the transverse stem $f'$ of the carriage and carrying a head $h$ for the tool or hob indicated by the letter $i$. This slide $g$ may be manually adjusted on the carriage $f$ by turning the shaft $k$. The hob $i$ is driven from the main shaft $l$ through transmission gearing in the box $m$ and the driving connections shown most clearly in Fig. 4. The work spindle $c$ is driven through the transmission gearing within the boxes $m$ and $n$ and the driving connections shown most clearly in Figs. 7, 9 and 10. The change of speed of rotation of the work spindle is effected through suitable automatically operated speed controlling mechanism in the form of clutches controlled by a tappet wheel $o$ which is driven from the work spindle.

The carrier, as a whole, is moved in a direction longitudinally of the work spindle by a cam $r$ rotatably mounted in the base $a$. The transverse movement of the slide $g$ is brought about by a cam $s$ rotatably mounted in the carriage $f$. The cams $r$ and $s$ and the tappet wheel $o$ are all driven from the work spindle as is hereinafter described.

In order that the detailed descriptions of the construction of the machine and its mode of operation, which are to follow, may be better understood, a very brief statement of the general operation of the machine, where a single work spindle is employed, will be given here. The threading tool or hob $i$ is continuously driven at a selected speed of rotation depending, for instance, on the kind of material to be operated upon. The work spindle $c$, while the tool is being moved up to and out of operative relation to the work, is driven at a relatively fast rate of speed, and during the threading operation the work spindle is driven at a selected slow rate of speed depending, for instance, on the diameter of the piece to be threaded. Now, after the work has been positioned in the work spindle $c$ and the power thrown onto this spindle, the spindle, together with the tappet wheel $o$ and the cams $r$ and $s$ driven therefrom, are rotated at a relatively fast rate of speed; the cam $r$ quickly moves the tool carrier, as a whole, in a direction longitudinally of the tool to bring the latter opposite the work, and as this carrier approaches the limit of this quick forward stroke, the cam $s$ quickly moves the cross slide $g$ to bring the tool radially up to the work. At this time a tappet on the tappet wheel actuates the clutch which controls the speed of rotation of the work spindle, whereupon this spindle, together with the tappet wheel and the cams $r$ and $s$, will be slowly driven. The carriage $f$ is moved slowly by the cam $r$ in a direction longitudinally of the tool in accordance with the desired pitch of the thread to be cut and the cross slide $g$ is moved to feed the tool into the work to the required depth of the thread. Thereafter, the cross slide $g$ remains stationary on the main carriage $f$ while the latter continues its slow movement a distance equal to the desired pitch of the thread during which time the work makes one complete revolution. When the threading operation is completed, a second tappet will again throw the clutch resulting in a rapid rotation of the spindle, the tappet wheel and the cams $r$, $s$; the cam $s$ will withdraw, preferably at a fast rate of speed, the tool from the work, and then the cam $r$ will move the tool carriage longitudinally back into inoperative position. Suitable mechanism, controlled by the dog wheel, is provided for automatically stopping the parts at the end of the sequence of operations to allow the completed piece of work to be withdrawn from the work spindle and a new piece inserted in its place.

From the foregoing description, it will be seen that since the cams $r$ and $s$ are driven from the work spindle, the ratio of the speeds of rotation between the spindle and the cams remains constant regardless of changes of speed of the spindle. Therefore, if the cam $r$ has been so adjusted to move the tool longitudinally during the cutting operation at a speed which will give a given pitch of thread on a piece of work of one diameter, this same adjustment or setting may be used for cutting a like pitch on pieces of work of lesser or greater diameters. For the purpose of changing from one pitch to another the cam $r$ is provided with a plurality of interchangeable inserts or pitch blocks, one for each pitch. The arrangement is further such that the extent or distance which the cross slide is moved by the cam $s$ to bring the tool radially up to the work and then feed the tool into the work to the desired depth, is constant, but the speed at which this cross slide moves to that extent is variable, the desired variations in speed being brought about by properly adjusting the tappets on the tappet wheel. The reason for this latter arrangement is that where a thread of desired pitch, for instance 8 pitch, is to be operated upon, the cross slide in order to save time is moved for the greater portion of its stroke at a rapid rate of speed and is then moved slowly for only a small portion of its stroke, corresponding to the depth of the thread to be cut. Where a thread of larger pitch, for instance 4 pitch, is to be cut, the tool must enter into the work twice the depth required for the 8 pitch thread; therefore, the cross slide is moved slowly a distance twice as great as that required in the previous instance.

Referring now to the detail construction of the machine, the arrangement of the tool carrier and the tool head, and the manner in which the tool is driven will first be described. Adjustably mounted on the under side of the head or longitudinally extending part of the carriage $f$ is a bar 25 carrying at its forward end a follower or roller 26 working in the cam groove of the cam $r$, as shown in Fig. 6. Adjustment of the carriage relative to this bar is brought about by manually turning a knurled head 27 which, through suitable pinions 28, rotates a pinion 29 journaled in the carriage $f$ and meshing with the rack 30 on the side of the bar 25, as shown most clearly in Figs. 1 and 4. The carriage $f$ and the bar are clamped together in any desired position of adjustment by turning the handle 31. The purpose of providing the adjustable bar 25 on the tool carrier is to permit of longitudinal adjustment of the tool in accordance with the extent to which the part of the work to be threaded projects beyond the work spindle $c$.

The cross slide $g$ carries on its under face, as shown in Figs. 4 and 5, a nut 35 provided with a follower or roller 36 which works in the groove of the cam $s$ fixed to a pin 37 journaled in suitable bearings 38 depending from the main carriage. In the present instance, the nut block comprises two parts 35, 35′ adapted to be clamped to a dove-tail gib 41 on the under side of the cross slide by a clamping bolt 42 which extends through an elongated slot 43 in the side of the main carriage $f$. A screw 44, as most clearly shown in Figs. 4, 5 and 5ᵃ, is in threaded engagement with the block 35; extends through a depending lug 47 on the cross slide and is fixed against longitudinal movement relative thereto by the abutments or collars 48; and carries at its rear end a bevel gear 46 meshing with a like gear on the rear end of the shaft $h$ which is journaled in suitable bearings on the slide.

It will be seen that the extent of throw of the slide $g$, as effected by the cam $s$, is constant. To adjust the tool radially of the work spindle and thus take care of pieces of work of different diameters and different pitches, the nut 35 is loosened from the gib 41 of the slide, and the shaft $h$ is then manually rotated to turn the screw 44 resulting in moving the slide longitudinally of the nut which is held stationary by the cam $s$. The nut is then clamped to the gib 41 by turning up the bolt 42. The extent to which the shaft $h$ is moved may be determined on the dial 49.

The tool heads shown in Figs. 8 and 9 are generally similar in construction. In each case, the head includes a body portion or casting 50 in which is journaled a tool spindle 51 carrying at its forward end the hob $i$. The forward end of the tool spindle may be supported in a bearing bracket 53 which is to be removed when the hob is to cut an internal thread. The tool head is pivoted by a stud 54 to the cross slide $g$ and may be angularly adjusted by a set screw 55 carried by the body portion 50 and engaging against an abutment 56 on the cross slide $g$. The head is secured to the cross slide $g$ in adjusted position by means of screws 57 passing through openings in the head which are slightly greater than the shanks of the screws to permit of the angular adjustment of the head. This provision for angularly adjusting the head may be used to advantage in setting the tool so that the line of contact between the tool and the work will be parallel to the axis of the work. This setting of the tools is frequently necessary because, in hardening the tools, they often take a slightly tapered form.

In the embodiment shown in Fig. 8, the tool spindle carries a bevel gear 59 with which meshes a bevel gear 60 on a shaft 61 journaled at its forward end in suitable bearings 62 in the body portion 50 and having splined to its rear end the bevel gear 63, as shown in Fig. 4. In the embodiment shown in Fig. 9, the bevel gear 59 is fixed to an intermediate shaft 64 which is connected up through gearing 65 to the tool spindle. 66 denotes a fly wheel. Either of the tool heads illustrated may be used for both external and internal threading. The head shown in Fig. 9 is used where a long piece of work is to be operated upon and supported at its outer end by the adjustable tail stock 67.

The shaft 61 is provided with a flexible joint 68 which is in vertical alinement with the stud 54 so as to permit of angular adjustment of the tool head. The bevel gear 63 is rotatably mounted in a housing 69 mounted on the rear end of the stem or leg $f'$ of the main carriage $f$. Meshing with the gear 63 is a bevel gear 70 carried by a vertical shaft 71 mounted in the carriage $f$ and carrying at its lower end a gear 72 with which meshes a bevel gear 73 splined to a shaft 74 which is driven through suitable speed change gearing within the gear box $m$. The selected speed at which the shaft 74 and the tool spindle are driven will depend, for instance, upon the material of the work operated upon.

Reference will now be made to the work spindle $c$ and the driving mechanism therefor. As will be seen from Fig. 6, the work spindle $c$ carries the spring collet $d$ which is moved into and out of clamping engagement with the work by a longitudinally movable tube 80 operable through the levers 81 and sleeve 82 by the yoke 83 and handle 84, as is usual. As shown in Fig. 7, the work spindle $c$ is provided with a worm wheel 85 with which meshes a worm 86 on a drive shaft 87 provided at its forward end with a detachable crank handle 88. Interposed in the drive shaft is a clutch 89 which may be either automatically or manually thrown out to stop rotation of the spindle without throwing the power off of the gearing through which the spindle is driven. On the rear end of the drive shaft 87 is a reversing clutch including a pair of opposed bevel gears 90 loose on the shaft 87, and a clutch sleeve 91 fixed to the shaft and adapted to be moved into and out of clutching engagement with the clutch teeth on the respective gears 90 by means of a yoke 92 fixed to a shaft 93 carrying an operating handle 94. Meshing with the gears 90 and driving them in opposite directions is a bevel gear 95 fixed on the upper end of a vertical shaft 96 provided at its lower end with an overrunning or one-way clutch $u$ through which the work spindle is driven at a relatively low selected speed. This clutch, which is of a well known type, includes a worm wheel 100 loose on the shaft 96, and a disk 101 fast on that shaft and carrying, as shown in Figs. 7 and 10, a link 102 and a friction shoe 103. The arrangement of this clutch is such that when the shaft 96 and disk 101 are driven at a greater speed than the worm wheel, the shoe will ride free of the latter, but when the shaft is not driven at a greater speed, the shoe is wedged against the worm wheel causing the worm wheel and the shaft to rotate together. This shaft 96 is also provided with a clutch $v$ comprising a sleeve 106 loose on the shaft 96 and a slidable sleeve 107 keyed to the shaft. The sleeve 107 is moved into and out of clutching engagement with the sleeve 106 by an escapement clutch $w$, the operation of which is controlled by the tappet wheel $o$, as hereinafter described more in detail.

Figure 2:
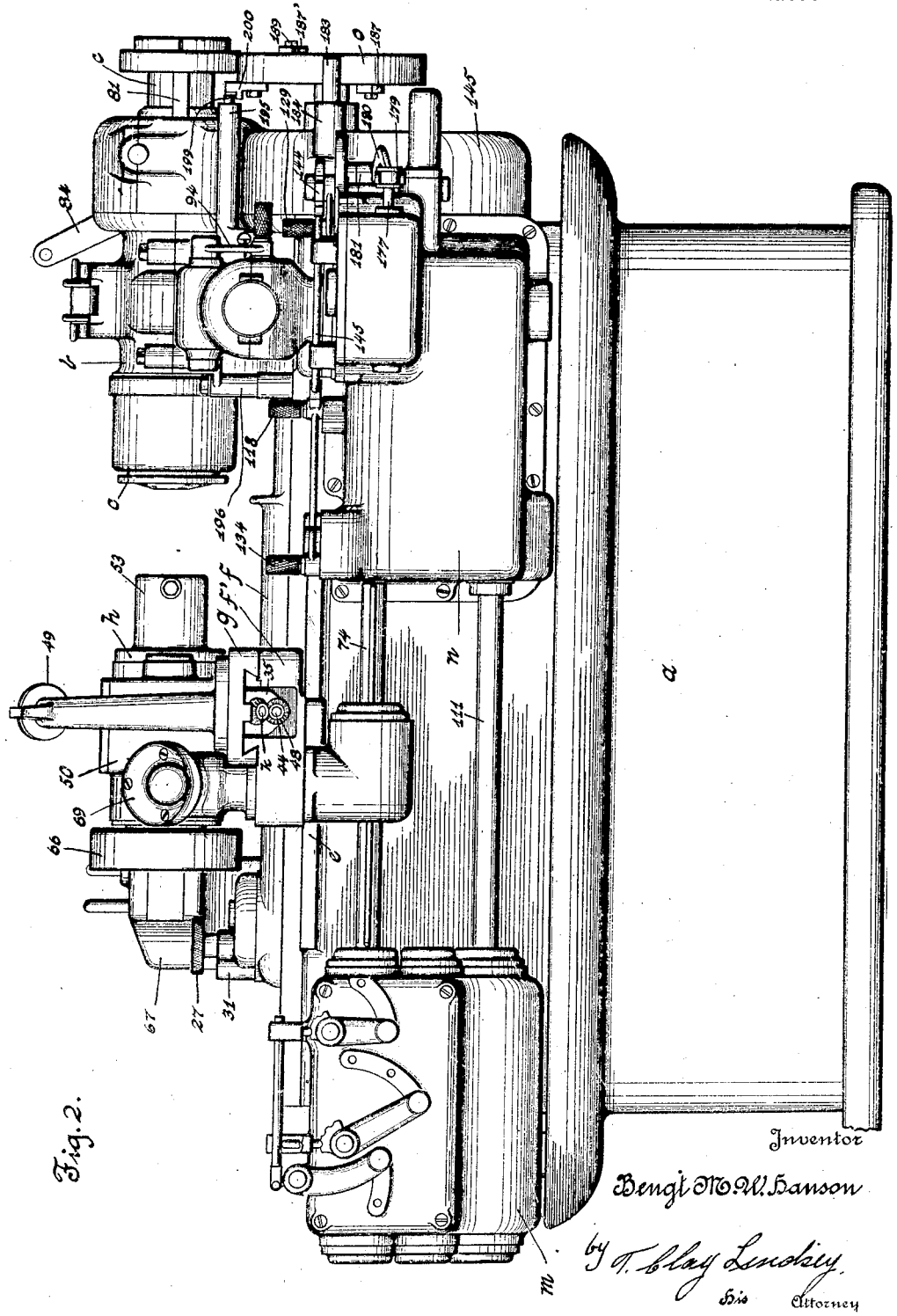
Fig. 2 is a rear view thereof.

Fixed to the loose sleeve 106 of the clutch $v$ is a bevel gear 110 which is constantly driven at a uniform fast rate of rotation as follows: Referring to Figs. 2 and 10, leading from the gearing within the transmission box $m$ is a constantly driven shaft 111 which extends into the transmission box $n$. Within this transmission box $n$, the shaft 111 is provided with a pinion 112 (see Figs. 10, 11) meshing with a large gear 113 on an intermediate shaft 114 carrying a fixed bevel gear 115 meshing with the gear 110 which, as stated, is fixed to the clutch sleeve 106. In the present illustrative disclosure, the gear 113 forms a part of a friction clutch, it being normally held in frictional engagement with a stepped gear 116 fixed to the shaft 114 by means of a spring pressed sleeve 117 splined on the shaft 114. This sleeve 117 may be withdrawn from frictional engagement with the gear 113 by a handle 118 working through a yoke 119. This clutch is thrown out when it is desired to shift the gears within the transmission box $m$.

The worm gear 100 of the clutch $u$ is constantly rotated at any desired single speed within a given range of selected speeds in the following manner: Fixed to the shaft 114 is the cone or stepped gear 116 meshing with a plurality of gears 123 loose on a shaft 124. The gears 123 are selectively fixed to the shaft 124 by a pawl 125 connected to a rod 126 longitudinally slidable within the shaft 124 and having a rack 127 with which meshes a toothed disk 128 adapted to be rotated by turning a handle 129. Splined on the shaft 124 are a large gear 131 and a small gear 132 adapted to be shifted by means of a fork 133 and handle 134. The gears 131, 132 are arranged to mesh respectively with a small gear 135 and a large gear 136 on a worm shaft 137. On the shaft 137 is a worm 138 in mesh with the worm wheel 100 of the clutch $u$.

It will be seen that with the arrangement of gearing described, the gear 110 and clutch sleeve 106 are continuously rotated at a uniform speed through the shaft 111, intermeshing gears 112, 113, shaft 114 and bevel gear 115. The selected speed at which the tool spindle is to be driven is obtained by swinging the handle 129 to fix the proper gear 123 on the shaft 124 and moving the handle 134 to shift the gears 131, 132. The drive of the worm wheel 100 of the clutch *u* is through the constantly driven stepped gears 116, the gears 123 which are selectively fixed to the shaft 124, the intermeshing gears 131, 135 (or 132, 136 as the case may be), the shaft 137 and the worm 138.

For the purpose of preventing shifting of the gears when the power is on, that is while the friction clutch of which the gear 113 forms a part is engaged, the following arrangement is provided: Extending from the handle portion 134 is a segment 140 provided with a pair of notches 141 in which is adapted to engage a finger 142 carried by the handle 118 by which the clutch 113 is operated. On the outer end of the shaft 143, which carries the toothed member 128, is a notched plate 144 and in the notches of this plate one end of a longitudinally movable rod 145' is adapted to engage. The other end of this rod engages against the outer end of the handle 118 which is provided with a notch 146'. In Fig. 1, the lever 118 for the friction clutch is shown in that position when the clutch is in. In this position, it will be seen that the finger 142 engages in one of the notches 141, thus preventing operation of the handle 134. The outer end of the handle 118 prevents withdrawal of the rod 145' from one of the notches of the plate 144 so that this latter plate together with the toothed member 128 cannot be turned. When the handle 118 is moved into position to disengage the friction clutch, the finger 142 is withdrawn from the notches 141 permitting of operation of the handle 134 and the notch 146 is brought into registry with the rod 145', permitting the latter to be moved out of the notch in the plate 144, thus allowing this plate, together with the parts connected thereto, to be operated.

The drive of the tappet wheel *o* and the cams *r* and *s* from the work spindle is as follows: Referring to Figs. 3 and 6, it will be seen that fixed to the spindle *c*, within a casing 145, is a gear 146 with which meshes either a small gear 147 or a large gear 148. Fixed to the gear 148 is a pinion 149 meshing with a gear 150 fixed on the shaft 151 which carries the cam *r*. Fixed to the shaft 151 is a gear 152 meshing with a gear 153 on the tappet wheel shaft 154. This tappet wheel shaft 154 carries, as shown in Fig. 4, a bevel gear 155 meshing with a like gear 156 on the rotatable stud 37 which carries the cam *s*, as heretofore stated. It is preferable that the spindle be driven in one direction when an external thread is being cut and in the reverse direction when an internal thread is being cut, in order that the parts of the tool carrier be securely held to their seats. This will be clearly understood upon reference to Figs. 20 and 21 where the hob *i* is shown as rotating in the same direction for both internal and external threading while the pieces of work W rotate in opposite directions. In both instances, the tool is forced downwardly so that the tool head, the cross slide and the carriage are pressed against each other and the carriage is securely held to its seat on the base *a* of the machine, and thus there is no play between or vibration of these parts. If the hob *i* and the work were rotated in the direction of the dotted arrows of Fig. 21, the tendency would be to raise the hob and the parts supporting the same, leading to inaccuracies, undesirable strains, and looseness and play between the parts. The change in the direction of rotation of the spindle is effected, as heretofore stated, through the reversing clutch which includes the gears 90. The tappet wheel and the cams, however, are rotatable in one direction only in accomplishing their functions, and therefore when the direction of rotation of the spindle is changed, it is necessary to change the gearing between the tappet wheel and the spindle so that the former will not change its direction of rotation. To this end, the large gear 148 and the small gear 147, which are in mesh with each other, are carried by a rocker 157 in such manner that either of the gears 148 or 147 may be thrown into mesh with the gear 146.

The clutch *v* which, as stated, when in engagement results in driving the work spindle and cams at a fast rate of speed, is controlled through the escapement ratchet clutch mechanism *w* by the tappet wheel *o* in the following manner: Fixed on a freely rotatable shaft 165 within the casing *n* (see Figs. 7 and 10) is a ratchet 166 and a gear 167, the latter being in mesh with a gear 168 integral with the gear 110 which, as previously stated, is fixed to the loose clutch sleeve 106 of the clutch *v*. As the gear 168 is constantly driven, the gear 167, together with the shaft 165 and the ratchet wheel 166, is constantly rotated. Loose upon the shaft 165 is a cam 169 which, upon rotation, shifts a shipper lever 170 to move the clutch sleeve 107 up and down on the shaft 96 and thereby engage and disengage the clutch *v*. Fixed to, so as to rotate with, the cam 169 is a disk 172 carrying a spring pressed pawl 173, periodic engagement of which with the constantly rotating ratchet wheel 166 is controlled by an escapement yoke 174 having diametrically opposite stops 175 adapted to be alternately brought into the path of travel of the pawl 173 so that the cam 169 is intermittently rotated through angles of 180°. The escapement yoke 174 is fixed to, so as to move with, a rod 177 slidably supported in bearings 178 in the casing n. The outer end of the rod 177 carries a grooved collar 179 which receives the yoke end of a lever 180 pivoted at 181 as shown in Figs. 1 and 3. The opposite end of the lever 180 is hingedly connected, as at 182, to a pin 183 slidably mounted in a bearing 184. The free end of this pin 183 carries a tappet 185 with which the tappets 187 of the tappet wheel o are adapted to cooperate. In the present instance, there are two such tappets 187, one on each side of the tappet wheel. The active faces of these tappets are inclined, as at 188, so that one of the tappets will throw the pin 183 in one direction to disconnect the clutch v and the other tappet (designated for convenience by 187') will throw the pin 183 in the opposite direction to engage the clutch v. These tappets are adjustable angularly of the tappet wheel, in the present instance this adjustment being provided for by securing the tappets by T-bolts 189, the heads of which engage in undercut grooves 190 in the faces of the tappet wheel.

In order to automatically stop the rotation of the cams r and s when the tool carrier reaches its inoperative or withdrawn position, the following arrangement is provided:

Referring to Figs. 1 and 12, 195 is a lever pivoted to the frame as at 196 and connected intermediate its ends to the slidable sleeve 197 of the clutch 89, this clutch, as stated, being interposed in the drive shaft 87 between the work spindle and the power operated means for driving the same. The lever 195 is normally urged in a direction to hold the clutch 89 engaged by a spring pressed plunger 198. Mounted in the free end of the lever 195 is a spring pressed pin 199, the outer end of which projects into the path of movement of a tappet 200 adjustably mounted on the tappet wheel o. When the tappet 200, which moves in the direction of the arrow Fig. 12, engages the pin 199, the lever 195 is rotated counter-clockwise and a spring pressed latch 201 carried by the lever engages a catch 202 to hold the clutch 89 disengaged. The latch is released from the catch 202 and the plunger or pin 199 is withdrawn from the path of the tappet 200 by pushing in a rod 203 having an inclined portion 204 which wipes against a stud 205 carried by the pin 199 and engaging against the tail end of the latch 201. Disengagement of the clutch 89 may be manually effected at any time by pulling out the rod 203, to bring a shoulder 206 thereon into engagement with the stud 205 which results in swinging the lever 195 to a position where the latch engages the catch 202. The rear corner of the tappet 200 is cut away or relieved as at 207 so as to permit the outer end of the pin 199 under the influence of its spring, to clear the tappet 200 after the latter has thrown the lever 195.

Reference will now be had to the construction of the cams r and s, the relation of which to each other and the tappet wheel o will be most clearly understood by reference to Fig. 13. The cams rotate in the direction of the arrow shown on the cam r. The cam groove of the cam r has an inclined portion 210, which is operative to advance the tool carrier longitudinally up to the work; a pitch portion 211, which is operative to feed the tool longitudinally in accordance with the desired pitch to be cut; a return inclined portion 212, which is operative to withdraw the tool longitudinally back into inoperative position, and a short inactive portion 213 in which the follower 26 connected to the tool carriage f engages when the cam r is automatically stopped. The pitch portion 211 of the cam groove is provided with a removable block 214. There will be as many of these interchangeable pitch blocks as there are different pitches of thread to be cut, within the capacity of the machine. These pitch blocks constitute means for varying the extent of throw of the cams. The inclination of the grooves in these blocks will vary, of course, in accordance with the desired longitudinal feed of the tool, that block shown in Fig. 13 being employed for cutting a right handed thread of maximum pitch. The dotted lines 211' on this block 214 indicates the inclination of the groove in that insertible block which is employed for cutting a left handed thread of maximum pitch. It will be seen that the portion 210 and the cam grooves of the several pitch blocks accurately register. The forward end of the return inclined portion 212 is of increased width, as at 215, so as to permit the follower 26 to ride out of any one of the pitch grooves into the return groove portion 212.

The groove in the cam s has an inactive portion 217 in which the follower 36 engages while the work carriage is being moved longitudinally up to and away from the work by the cam r; a short inclined portion 218 which feeds the tool laterally up to and into the work; a short inactive portion 219 in which the follower 36 rides during the threading operation; and a short return inclined portion 220 which moves the tool laterally out of engagement with the work.

For the purpose of catching oil which may flow through the openings in the top of the base a, there are provided on the inside walls of the base upwardly inclined flanges 225 forming oil receiving channels 226 which communicate through ports 227 with the channels 228 on the external walls of the base. Supported on the flanges is a plate 229 which is slightly convex to direct the oil which falls thereon into the channels.

To set up the machine, where a single work spindle is employed, as shown in Figs. 1 and 2, the gears within the transmission box m are shifted to drive the tool spindle at a selected speed depending, for instance, on the kind of material of which the work is composed. The levers 118 and 129 are shifted so that the work will be driven at a selected slow speed during the cutting operation depending on the diameter of the work, it being understood that this shifting of the gears can only be effected when the friction clutch of which the gear 113 forms a part is disengaged. The clutch 89 is disengaged by pulling out on the knob 203' so as to disconnect the work spindle from the power. That pitch block corresponding with the pitch to be cut is inserted in the cam r. A piece of work of the lot to be threaded is placed in the collet in the now non-rotating spindle c, the block 35 is unclamped from the slide q, and the cam s is turned into a position where the short inactive portion 219 receives the follower 36. The shaft k is then turned to feed the cross slide to such position that the hob is just touching the work. The cam s is then turned until the follower 36 is in the groove portion 217, and the shaft k is turned through such an angle that the hob is advanced towards the axis of the work a distance equal to the depth of the thread to be cut, this distance varying, of course, with different pitches. The angle through which the shaft k should be turned to thus set the hob will be indicated on the dial 49. The block is now clamped to the slide q and the tappets are properly adjusted on the tappet wheel to function at the correct times. In setting the tappets on the wheel, it will be found of advantage to manually turn the tappet wheel and cams by means of the handle 88.

Assuming now that the parts have been properly adjusted to take care of the particular work at hand, a piece of work is fitted into the spindle and the power is thrown onto the spindle by pushing in on the rod 203 so as to engage the clutch 89. The work spindle, tappet wheel and cams will now be driven at a fast rate of speed through the clutch v of the automatically operated speed controlling mechanism. The inclined portion 210 of the cam r will advance the tool longitudinally at a fast rate of speed, the portion 217 of the cam s being inactive, and when the follower 36 has reached such position in the inclined portion 218 of the cam s that the hob is just in about engagement with the work, the tappet 187 will engage the tappet 185 of the slidable pin 183, and through the lever 180 trip the escapement ratchet clutch mechanism w resulting in one-half revolution of the cam 169 and the disengagement of the clutch v. The cams will now be driven at a slow selected speed through the clutch u, and during this slow rotation of the cams, the remainder of the inclined portion 218 of the cam s will feed the hob to the right depth into the work while the pitch portion 211 of the cam r is moving the tool in accordance with the pitch to be cut. After the tool has been moved to the full depth, the pitch portion 211 moves the tool longitudinally the distance of one thread while the work spindle is making slightly more than one revolution. After the cutting operation is completed, the tappet 187' engages the tappet 185 of the pin 183 to again trip the escapement clutch mechanism w and throw the clutch v in. The cams will now be driven at a fast rate of speed to quickly withdraw the hob laterally from the work and then draw the hob longitudinally back into inoperative position. At this time the tappet 207 will engage the spring pressed plunger 199 resulting in disengagement of the clutch 89 so that the power is thrown off of the spindle and cams. The finished piece of work is now withdrawn from the spindle and a new piece is substituted in its place and the machine again thrown into operation.

It will be seen that since the work spindle and the cams for moving the tool support rotate in unison, the threading operation is very smoothly carried out without inaccuracies resulting from backlash or loose movement between the parts, and the tool may be passed successively several times over the work with the assurance that it will cut alike each time. It is of advantage to move the tool longitudinally into an inoperative position where the tool is spaced from the work for the reasons that the pieces of work may be readily placed in and taken out of the chuck or collet without danger to the workman; also, the tool will clear the end of the work thus making the machine adaptable for both internal and external threading.

If desired, the slow and hurry-up motion, as effected through the escapement ratchet clutch mechanism and controlled by the tappets, may be employed to intermittently change the speed of rotation of the spindle during one revolution thereof and while the tool is being moved by the pitch portion of the cam r. This will be found of advantage, for instance, when forming a thread on a tap, the tap being quickly rotated when a groove is opposite the tool and then slowly rotated during the threading of the lands. For instance, in Fig. 13, the surface of the tap 301 is shown as laid out straight. The tappet 302 (shown in dotted lines) will trip the escapement ratchet clutch mechanism so that the spindle and tap will be driven fast while the groove 303 thereof is opposite the tool, then the tappet 304 will result in the throwing out of the fast clutch $v$ so that the spindle and cams will be driven at a slow rate of speed during operation upon the land 305 and so on.

The machine may also be used for cutting a tapered thread. In this case, as shown in Figs. 22 and 23, the portion 219''' of the cam $s'''$ is inclined so as to feed the hob radially towards the axis of the work (or away from the axis of the work, depending on whether a right or left hand screw thread is being cut) in accordance with the taper of the thread to be cut while the pitch groove 211 of the cam $r$ is moving the hob longitudinally a distance of one thread. As shown in Fig. 23, while the pitch portion 211 is moving the hob longitudinally from $x$ to $y$, the portion 219''' of the cam $s'''$ is moving the tool radially into the work a distance indicated by $z$, $x$.

The machine of the present invention, as previously stated, is adapted to be equipped with two tool spindles, and a pair of tools. Such arrangement is shown in Figs. 14 to 19. Referring to these figures it will be seen that in place of the tool head $h$ provided with a single tool $i$ (see Figs. 1, 8 and 9) there is substituted a head $h'$ having a tool spindle 51' provided at each end with a hob $i$. On the bed of the machine are two work spindles $c'$ and $c$, both of which, if desired, may be fixed or non-adjustable, in which event they would be in substantial alinement with each other and the two hobs would be of the same diameter. Preferably, however, one of these spindles is adjustable. In the present instance, the spindle $c'$ is substituted for the tail stock 67 and is mounted in a housing $b'$ which forms a part of a supplemental slide 250 mounted on a main slide 251 which is adjustable on the ways 252. The main slide is adapted to be clamped in any longitudinal position of adjustment by turning up the bolts 253. The supplemental slide is adjustable, to move the spindle laterally, by turning the handle 254. The spindle $c'$ is adapted to be driven from the other spindle $c$ as follows: 256 designates a casting adapted to be removably secured to the housing $b$ and carrying a shaft section 257 which is bifurcated at its inner end so as to have driving connection with the outer end of the shaft 87. On this shaft section 257 is a bevel gear 258 meshing with a gear 259 on the left hand end of a shaft 260 which extends across the front of the machine. It is to be understood that when the casting 256 is attached to the housing $b$ the casting 300 which carries the handle 88, as shown in Fig. 7, is removed. Splined on the right hand end of the shaft 260 and mounted in suitable bearings in the main slide 251 is a bevel gear 262 meshing with a bevel gear 263 carried by a shaft 264 journaled in the main slide 251 and carrying a worm 86' meshing with the worm wheel 85' fixed to the spindle $c'$. It will be seen that with this arrangement both of the spindles are driven in unison through the same selected speed mechanism and automatically operated speed controlling mechanism.

When the hobs $i$ are to be so moved that one of them will operate on the work carried by one spindle and then the other hob will operate on the work carried by the other spindle, the cams $r'$ and $s'$, shown in Fig. 18, are substituted for the respective cams $r$ and $s$ of the preceding embodiment. It will be seen that the cam $r'$ is provided with a pair of pitch grooves $211^a$, $211^b$, an inclined portion $210^a$ for moving the tool longitudinally in one direction, and a second inclined portion $210^b$ for moving the tool longitudinally in the opposite direction. The cam $s$ is provided with two inclined portions $218^a$, $218^b$, for advancing the cross slide to feed the tools radially of the respective pieces of work, and two inclined portions $220^a$, $220^b$ for withdrawing the tools radially from the work. The tappets $187^a$, $187'^a$, $187^b$ and $187'^b$ are adjusted on the tappet wheel $o$ as shown in Fig. 18.

The operation of the machine when equipped with two work spindles and the cams, as shown in Figs. 14 to 18, is as follows: Assuming that the left hand hob $i$ of Fig. 14 has just finished the threading operation on the piece of work carried by the spindle $c$, the tappet $178'^a$ will now trip the escapement ratchet clutch mechanism $w$ to engage the clutch $v$ whereupon the cams $r'$, $s'$, will be driven at a fast rate of speed, and owing to the inclined portion $220^a$ of the cam $s'$ the slide will be quickly withdrawn from the work, and owing to the inclined portion $210^a$ of the cam $r'$ the tool carriage will be moved longitudinally to a position where the right hand tool is in proper longitudinal relation to the piece of work carried by the spindle $c'$. The inclined portion $218^b$ of the cam $s$ will quickly move the cross slide forwardly until the right hand hob $i$ just touches the work and at this time the tappet $187^b$ will trip the escapement ratchet clutch mechanism throwing out the clutch $v$ and resulting in the driving of the cams $r'$ and $s'$ at a slow selected speed and, while the cams are being so driven, the remaining part of the inclined portion $218^b$ of the cam $s'$ will move the slide $q$ to such extent that the right hand tool is fed to the proper depth into the work and the pitch portion $211^b$ of the cam $r'$ will move the tool longitudinally the distance of a thread during the cutting operation. Then the tappet 187'ᵇ will trip the escapement ratchet clutch mechanism to engage the clutch v whereupon the cams will again be driven at a fast rate of speed, the portion 220ᵇ will move the right hand tool radially from the work, the inclined portion 210ᵇ of the cam r' will move the tool carriage longitudinally into such position that the left hand hob i will be opposite the new piece of work which has been substituted in the spindle c while the right hand hob was cutting the piece of work held in the spindle c'. The cams r' and s' will continue to rotate at a fast rate of speed until the inclined portion 218ᵃ of the cam s' has moved the slide g to such a position that the left hand hob i just touches the work and then the tappet 187ᵃ will trip the escapement ratchet clutch mechanism to disengage the clutch v whereupon the cams will be driven at a low rate of speed and, while so rotating, the remaining part of the inclined portion 218ᵃ of the cam s' will feed the left hand tool to the proper depth into the work, and the pitch portion 211ᵃ of the cam r' will feed the tool longitudinally of the work the distance of a thread. The tappet 187'ᵃ will again trip the escapement ratchet clutch mechanism to engage the clutch v and the sequence of movements of the parts are thereafter again repeated.

It will be seen that with the arrangement just described, the spindle c may be adjusted longitudinally and at right angles to its axis so as to accommodate pieces of work of different lengths and diameters and also to permit of internal or external threading of pieces of work held by the spindle c'. The cam r' may be so adjusted by inserting the proper pitch blocks that both of the hobs will cut right hand threads; or one of the hobs will cut a right hand thread on the piece of work carried by one spindle and the other hob will cut a left hand thread on the work carried by the other spindle; or one of the hobs may cut an external thread while the other may cut an internal thread.

If desired, the machine may be set up so that the two hobs will operate simultaneously on the pieces of work carried by the spindles c and c'. In this event, the cam r'' shown in Fig. 19, will be employed for moving the tool carriage longitudinally and the cam s, shown in Fig. 13, will be employed for feeding the tool radially to the work. The cam r'' is similar to the cam r and bears the same relation to the cam s as does the cam r to the cam s, as shown in Fig. 13, with the exception that the groove in the body portion of the cam r'' is not inclined and, therefore, is inactive.

In accordance with the provisions of the patent statutes, I have described the principle of operation of my invention together with the apparatus which I now consider to represent a practical embodiment thereof, but I desire to have it understood that the machine shown is only illustrative, it being susceptible of various modifications and changes which will be within the spirit of the invention without departing from the scope of the appended claims.

I claim as my invention:—

1. In a machine of the character described, a thread forming tool, a rotary work spindle, a movable support for said tool, a rotary cam connected to said support and having a portion moving said tool into and out of operative relation to the work and a portion for moving said tool during the cutting operation in accordance with the pitch to be cut, and means for driving said spindle at a greater ratio of speeds than one to one.

2. In a machine of the character described, a thread forming tool, a rotary work spindle, a movable support for said tool, a rotary cam connected to said support and adapted upon one complete revolution to move said tool forwardly into operative relation to the work, move it during the cutting operation, and then return it to inoperative position, and a positive connection between said spindle and cam whereby said spindle is rotated one revolution while said cam is moving said tool during the cutting operation and other revolutions while the tool is being moved into and out of operative relation to the work.

3. In a machine of the character described, a thread forming tool spindle, a rotary work spindle, a rotary cam having a portion for relatively moving said spindles longitudinally into and out of operative relation and a portion for relatively moving said spindles during the cutting operation in accordance with the pitch to be cut, and means for driving said work spindle and cam at a constant ratio of speeds with said work spindle making one complete revolution while said second mentioned portion of said cam is slowly moving said tool during the cutting operation.

4. In a thread forming machine for use in internal and external threading, a thread forming tool spindle, a rotary work spindle, devices for moving said spindles longitudinally and laterally one relative to the other, means for adjusting said spindles for internal or external threading, and means for driving said work spindle and devices.

5. In a machine of the character described, a thread forming tool, a rotary work spindle, a cam for moving said tool relative to said work spindle and including means for adjusting the extent of throw of said cam, and means for driving said cam and spindle at a constant ratio of speeds and including selective speed mechanism.

6. In a machine of the character described, a thread forming hob spindle, a rotary work spindle, means for relatively moving said spindles into and out of operative relation and relatively moving said spindles longitudinally during the cutting operation in accordance with the pitch of the thread, and means for automatically changing the speed of said first mentioned means.

7. In a machine of the character described, a thread forming tool spindle, a work spindle, devices for relatively moving said spindles longitudinally while out of engagement, laterally into and out of engagement, and longitudinally while in engagement in accordance with the pitch to be cut, and automatically controlled means for changing the speed of said devices during the cycle of movement of said spindles.

8. In a machine of the character described, a thread forming tool spindle, a rotary work spindle, a device for relatively moving said spindles one relative to the other, and means for driving said work spindle and device at a constant ratio of speeds including automatically operated mechanism controlling the speed of the same.

9. In a machine of the character described, a thread forming tool, a rotary work spindle, a device for moving said tool relative to said spindle and including means for varying the extent of movement thereof in accordance with the pitch to be cut, and means for driving said spindle and device at a constant ratio of speeds including automatically operated means controlling the speed of the same.

10. In a machine of the character described, a thread forming tool, a rotary work spindle, a cam for moving said tool longitudinally of the work and including a plurality of interchangeable camming surfaces corresponding to different pitches, and means for driving said cam and spindle at a constant ratio of speeds including automatically operated speed controlling mechanism.

11. In a machine of the character described, a thread forming tool, a rotary work spindle, a cam for moving said tool relative to the work and including means for varying the extent of throw of the cam, and means for driving said work spindle and cam at a constant ratio of speeds of greater than one to one and including automatically operated mechanism for controlling the speed of the same.

12. In a machine of the character described, a thread forming tool spindle, a rotary work spindle, a device for moving said spindles one relatively to the other, and means for driving said spindle and device at a constant ratio of speeds including selective speed mechanism and automatically operated mechanism for controlling the speeds of said spindle and device.

13. In a machine of the character described, a thread forming tool, a rotary work spindle, a device for moving said tool relative to said spindle and including means for varying the extent of movement thereof in accordance with the pitch to be cut, and means including selective speed mechanism and automatically operated speed control mechanism for driving said spindle and device at a constant ratio of speeds.

14. In a machine of the character described, a thread forming tool, a rotary work spindle, a cam for moving said tool relative to the work and including means for varying the extent of throw of said cam, and means including selective speed mechanism and automatically operated speed controlling mechanism for driving said work spindle and cam at a constant ratio of speeds of greater than one to one.

15. In a machine of the character described, a thread forming tool spindle, a rotary work spindle, a device for moving said spindle one relatively to the other, means for driving said device and work spindle at a constant ratio of speeds and including mechanism for controlling the speed of rotation of said cam, and means driven in unison with said cam for controlling said mechanism.

16. In a machine of the character described, a tool, a rotary work spindle, a cam for moving said tool relative to said spindle, a tappet wheel, means for driving said work spindle, cam and tappet wheel and including mechanism controlled by said tappet wheel for governing the speed of said members.

17. In a machine of the character described, a tool, a rotary work spindle, a device for moving said tool relative to said spindle, a rotary tappet wheel, means for driving said spindle, device and tappet wheel at a constant ratio of speeds and including selective speed mechanism and automatically operated speed controlling mechanism, said last mentioned mechanism being controlled by said tappet wheel.

18. In a machine of the character described, a work spindle, a carriage reciprocable longitudinally thereof, a transverse slide on said carriage, a tool on said slide, a cam for moving said carriage to bring said tool into and out of operative relation longitudinally to the work and move said tool during the cutting operation, a cam for moving said slide to feed the tool up to and into the work after the tool has been brought into longitudinal operative relation to the work and move the tool out of the work after the cutting operation has been completed, and driving means common to both of said cams.

19. In a machine of the character described, a work spindle, a carriage reciprocable longitudinally thereof, a transverse slide on said carriage, a thread forming hob thereon, a rotary cam connected to said carriage and having portions for moving said tool into and out of operative relation longitudinally to the work and a portion for moving said tool during the cutting operation in accordance to the pitch to be cut, a cam connected with said cross slide and having a portion for feeding the tool to and into the work and a portion for withdrawing the tool from the work after the cutting operation, and means for driving said cams in unison.

20. In a machine of the character described, a work spindle, a carriage reciprocable longitudinally thereof, a transverse slide on said carriage, a rotary cam connected to said carriage and having portions for moving said tool into and out of operative relation longitudinally to the work and a portion for moving said tool during the cutting operation according to the pitch to be cut, a cam connected with said cross slide and having a portion for moving said slide to feed the tool to and into the work and a portion for withdrawing the tool from the work after the cutting operation, and a driving connection between said spindle and cams.

21. In a machine of the character described, a rotary work spindle, a carriage reciprocable longitudinally thereof, a slide mounted for transverse movement on said carriage, a tool on said slide, a device for moving said carriage including means for varying the extent of throw thereof, a device for moving said slide, and means for driving said spindle and devices at a constant ratio of speeds.

22. In a machine of the character described, a thread forming tool spindle, a work spindle, devices for moving said spindles longitudinally and laterally one relatively to the other, and means including automatically operated speed controlling mechanism for driving said work spindle and devices.

23. In a machine of the character described, a work spindle, a carriage reciprocable longitudinally thereof, a transverse slide on said carriage, a tool thereon, a device for moving said carriage, a device for moving said slide, means for driving said devices and work spindle at constant ratio of speeds and including automatically operated means for controlling the speed thereof, and means driven in unison with said spindle for controlling said mechanism.

24. In a machine of the character described, a work spindle, a carriage reciprocable longitudinally thereof, a transverse slide on said carriage, a tool on said slide, a cam for moving said carriage, a cam for moving said slide, a tappet wheel, and means for driving said spindle, cams and tappet wheel including automatically operated speed controlling mechanism controlled by said tappet wheel.

25. In a machine of the character described a work spindle, a tool spindle, a device for moving said spindles longitudinally one relatively to the other, a device for moving said spindles laterally one relative to the other, and driving means including selective speed mechanism and automatically operated speed controlling mechanism common to said work spindle and devices.

26. In a machine of the character described, a work spindle, a thread forming tool, a cam including means for changing the throw thereof for moving said tool longitudinally of said spindle, a cam for moving said tool laterally of said spindle, and driving means common to said spindle and cams, said driving means including selective speed mechanism and automatically operated speed controlling mechanism.

27. In a machine of the character described, a work spindle, a carriage reciprocable longitudinally thereof, a slide on said carriage, a tool on said slide, a cam for moving said carriage, a cam for moving said slide, a tappet wheel, means for driving said spindle, cams and tappet wheel at a constant ratio of speeds and including selective speed mechanism, and automatically operated speed controlling mechanism, said last mentioned mechanism being controlled by said tappet wheel.

28. In a machine of the character described, a thread forming hob, a rotary work spindle, a movable support for said hob, a rotary cam connected to said support for moving said hob into and out of operative relation to the work and moving the hob during the cutting operation, means for driving said cam and work spindle at a constant ratio of speeds and including mechanism for automatically changing the speed of rotation of said spindle and cam, and adjustable means driven in unison with said cam for controlling said mechanism.

29. In a machine of the character described, a thread forming tool, a rotary work spindle, a cam for moving said tool relative to said spindle, a tappet wheel, adjustable tappets thereon, and means for driving said work spindle, cam and tappet wheel at a constant ratio of speeds and including mechanism controlled by said adjustable tappets for governing the speeds of said spindle, cam and wheel.

30. In a machine of the character described, a thread forming hob, a rotary work spindle, a cam for moving said work spindle longitudinally into and out of operative relation to the work and during the cutting operation, a second cam for moving said hob laterally up to and into the work after the hob has been brought into longitudinal operative relation to the work and moving the hob laterally away from the work after the cutting operation has been completed, driving means common to both of said cams and spindle and including mechanism for changing the speed of rotation thereof, and adjustable means for controlling said mechanism.

31. In a machine of the character described, a thread forming hob, a rotary work spindle, a cam for moving said work spindle longitudinally into and out of operative relation to the work and during the cutting operation, a second cam for moving said hob laterally up to and into the work after the hob has been brought into longitudinal operative relation to the work and moving the hob out of the work after the cutting operation has been completed, driving means common to both of said cams and spindle and including mechanism for changing the speed of rotation thereof, a tappet wheel driven at a constant ratio of speed relative to said cams, and adjustable tappets on said wheel for controlling said mechanism.

32. In a machine of the character described, a work spindle, a thread forming tool, a cam for moving said tool longitudinally of said spindle, a cam for moving said tool laterally; said cams being arranged to move said tool from a position in advance of the work longitudinally to a position opposite the work, then laterally toward the work and into the same to the depth of the thread to be cut while longitudinally moving the tool in accordance with the pitch to be cut, then axially in accordance with the pitch to be cut while the work is making substantially one revolution, then away from the work to the line on which the tool was first advanced and then axially along that line to its original inoperative position; means for driving said work spindle and cam in unison and including mechanism for changing the speed of rotation thereof, and adjustable means for controlling said mechanism.

33. In a machine of the character described, a work spindle, a carriage reciprocable longitudinally thereof, a transverse slide on said carriage, a tool thereon, a device for moving said carriage, a device for moving said slide, means for driving said devices and work spindle at constant ratio of speeds and including automatically operated means for controlling the speed thereof, and adjustable means driven in unison with said spindle for controlling said mechanism.

34. In a machine of the character described, a work spindle, a thread forming tool, a cam for moving said tool longitudinally of said spindle, and a cam for moving said tool laterally, said cams being arranged to move said tool from a position in advance of the work longitudinally to a position opposite the work, then laterally towards the work to the depth of the thread to be cut while longitudinally moving the tool in accordance with the pitch to be cut, then longitudinally moving the tool axially in accordance with the pitch to be cut while the work is making substantially one revolution, then withdrawing the tool from the work to the line on which it is first advanced, and then withdrawing the work along that line to its original inoperative position.

35. In a thread milling machine, a pair of longitudinally spaced apart work spindles adapted to carry separate pieces of work, a support, thread forming means thereon, and means for moving said support to bring said thread forming means into operative relation with the pieces of work carried by the respective work spindles.

36. In a thread milling machine, a pair of longitudinally spaced apart work spindles, a movable support, a pair of thread forming tools thereon, one for operation upon the work carried by each spindle, and devices for moving said support longitudinally and radially of said spindles.

37. In a thread milling machine, a pair of longitudinally spaced apart work spindles adapted to carry separate pieces of work, a carriage movable longitudinally thereof, a cross slide on said carriage, thread forming means carried by said slide and adapted to operate upon the pieces of work carried by said spindles, a cam connected to said slide for moving the same radially of the pieces of work, and a cam connected to said carriage for moving the thread forming means longitudinally of the work spindles in accordance with the pitches to be cut.

38. In a machine of the character described, a pair of longitudinally spaced apart work spindles, one adjustable relative to the other radially and longitudinally, a pair of thread forming tools, one for operation upon the piece of work carried by each spindle, means for moving said tools in unison longitudinally, and means for moving said tools in unison radially.

39. In a thread milling machine, a pair of longitudinally spaced apart work spindles adapted to carry separate pieces of work, a pair of longitudinally spaced apart thread forming hobs interposed therebetween, and devices for moving said hobs in unison longitudinally and laterally.

40. In a thread milling machine, a plurality of work spindles, a tool spindle movable axially from one to another operative position relative to the respective work spindles, and means for moving said tool spindle.

41. In a thread milling machine adapted for internal and external threading operations, a plurality of work spindles, a tool spindle and means for moving said tool spindle longitudinally from one operative position to another relative to the respective work spindles, then laterally, and then longitudinally during the threading operation.

42. In a thread milling machine, a pair of work spindles, a tool spindle, a device for moving said tool spindle longitudinally from one to another operative position relative to the respective work spindles, and for moving said tool spindle longitudinally in accordance with the pitch during the cutting operation on the work carried by the respective spindles, and means for moving said tool spindle laterally towards the work spindles after the tool spindle has been brought into longitudinal relation relative to the respective work spindles and away from the work spindles after the cutting operations have been completed.

43. In a thread milling machine, a pair of work spindles, a carriage movable longitudinally thereof, a cross slide on said carriage, a pair of longitudinally spaced thread forming tools carried by said slide and adapted to respectively operate on the pieces of work carried by said spindles, a device for moving said slide, and a device for moving said carriage.

44. In a thread milling machine, a pair of work spindles, a pair of longitudinally spaced apart thread forming tools arranged to move in unison, and means for moving said tools radially and longitudinally relative to the respective pieces of work carried by said work spindles.

45. In a thread milling machine, a pair of work spindles, a movable support, a pair of thread forming tools thereon, means for moving said support to feed said tools in the same direction radially towards and into engagement with the respective pieces of work carried by said spindles, and means for moving said support in a direction for moving said tools longitudinally during cutting operations.

46. In a thread milling machine, a pair of work spindles, a pair of thread forming tools, one for operation upon the work carried by each spindle and each arranged to the same side of the respective spindles, and means for moving said tools in unison radially and longitudinally relative to the respective pieces of work carried by said spindles.

47. In a thread milling machine, a pair of longitudinally spaced-apart work spindles, a support, a tool spindle on said support, and means for moving said support to bring said tool spindle into operative relation with the pieces of work carried by the respective work spindles.

48. In a thread milling machine, a pair of substantially alined work spindles, a movable support, a pair of thread forming tools thereon one for operation upon the work carried by each spindle, means for moving said support longitudinally of said spindles, and means for moving said support radially of said spindles.

49. In a thread milling machine, a pair of substantially alined work spindles, a carriage movable longitudinally thereof, a cross slide on said carriage, a pair of thread forming tools carried by said slide and adapted to respectively operate on the pieces of work carried by said spindles, a cam connected to said slide for moving said tools radially of the work, and a cam connected to said carriage for moving the tools longitudinally of the spindles in accordance with the pitches to be cut.

50. In a thread milling machine, a pair of work spindles, a pair of thread forming tools movable in unison, a cam having portions for longitudinally moving said tools to bring first one and then the other in longitudinal relation to the respective pieces of work carried by said spindles and portions for moving the tools longitudinally during the threading operations, and a cam having portions for moving said tools radially of the work.

51. In a thread milling machine, a pair of longitudinally spaced work spindles, a tool spindle carrying two tools one for operation upon the work carried by each spindle, means for moving said tool spindle longitudinally, and means for feeding said tool spindle radially.

52. In a thread milling machine, a pair of longitudinally spaced work spindles, a carriage movable longitudinally thereof, a cross slide on said carriage, a tool spindle on said slide having a pair of tools one for operation upon the piece of work carried by each work spindle, a cam for moving said carriage, and a cam for moving said slide.

53. In a thread milling machine, a pair of longitudinally spaced apart work spindles, driving means including selective speed mechanism common to both of said spindles, a tool spindle carrying two tools one for operation upon the work carried by each spindle, means for moving said tool spindle longitudinally, and means for feeding said tool spindle radially.

54. In a thread milling machine, a pair of longitudinally spaced work spindles, driving means including selective speed mechanism common to both spindles, a tool spindle carrying two tools one for operation upon the work carried by each spindle, a cam for moving said tool spindle longitudinally, a cam for moving said tool spindle radially, and driving means including automatically operated speed controlling mechanism common to both of said cams.

55. In a thread milling machine, a pair of longitudinally spaced work spindles provided with work holding means at their adjacent ends, a tool spindle provided with thread forming tools at its opposite ends, and means for moving said spindle to bring said tools into engagement with the respective pieces of work carried by said work spindles.

56. In a thread milling machine, a pair of work spindles, a movable support, a pair of thread forming tools thereon, means for moving said support for bringing said tools into engagement with the respective pieces of work carried by said spindles, and automatically operated means for changing the speed of said first-mentioned means.

57. In a thread milling machine, a plurality of work spindles adapted to carry separate pieces of work, a tool spindle, means for moving said tool spindle longitudinally from one operative position to another relative to said work spindles, then radially, and then longitudinally during the threading operations, and automatically operated means for changing the speed of said first-mentioned means.

58. In a thread milling machine, a plurality of longitudinally spaced work spindles adapted to carry separate pieces of work, a tool spindle, means for moving the tool spindle into engagement with and then longitudinally of the piece of work carried by one work spindle, and then moving said spindle into engagement with and longitudinally of the work carried by the other work spindle.

59. In a thread milling machine, a plurality of substantially alined work spindles adapted to carry separate pieces of work, a carriage, and a slide movable transversely thereon, a pair of tools on said slide, and means for moving said slide and carriage to bring said tools into operative position relative to the work carried by the respective work spindles, and then longitudinally of the work after the tools are in engagement therewith.

60. In a thread milling machine, for internal and threading operations, a pair of substantially alined work spindles adapted to carry separate pieces of work, a carriage, a slide on the carriage movable at right angles thereto, a tool spindle on said slide, and means for moving said carriage and slide to move said tool spindle alternately into operative relation with the respective work spindles.

61. In a thread milling machine, a plurality of longitudinally spaced apart work spindles, a carriage movable longitudinally thereof, a slide mounted thereon for transverse movement, a pair of thread forming tools on said slide, and means for moving said tools longitudinally one out of engagement with the work carried by one spindle while the other tool is moving into engagement with the work carried by the other spindle.

62. In a thread milling machine, a pair of substantially alined work spindles each adapted to carry separate pieces of work, one adjustable longitudinally of the other, a tool spindle provided with cutting means for operation upon the work carried by said work spindles, and means for moving said tool spindle to bring the cutting means into operative relation with respect to the pieces of work carried by said work spindles.

63. In a thread milling machine, a pair of longitudinally spaced apart work spindles each adapted to carry separate pieces of work, one adjustable radially of the other, a tool spindle provided with cutting means adapted for operation upon the respective pieces of work carried by said work spindles, means for moving said tool spindle longitudinally, and means for feeding said tool spindle radially.

64. In a thread milling machine, a pair of longitudinally spaced apart work spindles adjustable longitudinally and radially relatively to one another, said spindles being provided with work holding means at their adjacent ends each work spindle adapted to carry separate pieces of work, a tool spindle provided with a thread forming tool at each end, and means for moving said spindle longitudinally and radially.

65. In a machine of the character described, a pair of longitudinally spaced apart work spindles one adjustable both longitudinally and radially of the other, each work spindle being adapted to carry separate pieces of work, a tool spindle carrying a pair of tools one for operation upon the piece of work carried by each spindle, means for moving said tool spindle longitudinally, and means for feeding said tool spindle radially.

66. In a machine of the character described a tool, a work spindle adapted to be rotated in either direction, a cam for moving said tool and rotatable in a single direction, means for driving said spindle including mechanism for reversing the direction thereof, and a driving connection between said spindle and cam including means for changing the direction of rotation of said cam relative to that of said spindle.

67. In a machine of the character described, a thread forming tool rotatable in a single direction, a work spindle adapted to be rotated in either direction, a cam rotatable in a single direction for moving said tool, means for driving said spindle including automatically operated speed controlling mechanism, a reversing clutch between said mechanism and spindle, and a positive connection between said spindle and cam including a reversing clutch.

68. In a machine of the character described, a tool, a work spindle adapted to be rotated in either direction, a device rotatable in a single direction for moving said tool relative to the work, a tappet wheel rotatable in unison with said device, means for driving said spindle including speed controlling mechanism controlled by said tappet wheel, a reversing clutch between said mechanism and spindle, and a driving connection between said spindle and device and including a reversing clutch.

69. In a machine of the character described, a tool element, a work element, a movable support for one of said elements, a device for moving said support, means for driving said device including selective speed mechanism and a friction clutch adapted to slip when said support meets with excessive resistance, said mechanism being driven through said clutch, means for disengaging said friction clutch, manually operable means for said selective speed mechanism, and means for preventing said last mentioned means from being operated when said friction clutch is engaged.

70. In a machine of the character described, selective speed mechanism including a plurality of levers for shifting speeds, a friction clutch through which said selective speed mechanism is driven, a handle for operating said clutch, and interengaging means between said handle and levers for preventing actuation of the latter when said clutch is engaged.

71. In a machine of the character described, a rotary work spindle, a tool, a device for moving said tool relative to said spindle, driving means for said spindle, a rotary tappet wheel controlling said driving means, a positive connection between said spindle and tappet wheel and device, and means for disconnecting said spindle from said driving means to permit of manual actuation of said spindle, tappet wheel and device.

72. In a machine of the character described, a work spindle, a tool, a movable support for said tool, a cam for moving said support, driving means including speed controlling mechanism for said spindle, a positive driving connection between said spindle and cam, tappets movable in unison with said cam for controlling said mechanism, means for disconnecting said spindle from said driving means, and a detachable handle for manually actuating said spindle, cam and tappets.

73. In a machine of the character described, a rotatable work spindle, a movable support, a tool thereon, a cam for reciprocating said support, and a member adjustable on said support and connected to said cam.

74. In a machine of the character described, a work spindle, a movable support, a tool thereon, a cam for reciprocating said support, a rack adjustable on said support and connected to said cam, and a pinion journaled in said support and meshing with said rack for adjusting said support on said rack.

75. In a machine of the character described, a slide mounted for reciprocation, means for moving said slide, a member adjustable on said slide and connected to said moving means, means for adjustably clamping said member to said slide, a screw in threaded engagement with said member and journaled in and maintained against longitudinal movement relative to said slide, and means for rotating said screw to adjust said slide relative to said member when the latter is unclamped from said slide.

76. In a machine of the character described, a carriage, a slide mounted for reciprocation thereon, a cam rotatably mounted in said carriage, a block associated with said cam, means for clamping said block in any predetermined position of adjustment on said slide, a screw in threaded engagement with said block and fixed against longitudinal movement relative to said slide, a shaft for turning said screw, and a dial associated with said shaft for indicating the adjustment of said slide.

77. In a machine of the character described, a support, a head, a pivot connecting said head to said support, a spindle in said head, means for adjusting said head about said pivot, means for securing said head in adjusted position on said support, and a drive shaft operatively connected to said spindle having a flexible joint in alinement with said pivot to permit of angular adjustment of said head.

78. In a machine of the character described, a support, a head thereon, a pivot connecting said head to said support, screws passing through apertures in said head and into said support, said apertures being of larger diameter than said screws to permit of angular adjustment of said head.

79. In a machine of the character described, a shaft, a one-way clutch associated therewith, selective speed mechanism through which said shaft is driven, a clutch including a constantly driven member loose on said shaft and a slidable sleeve splined to said shaft, a cam for moving said sleeve into and out of engagement with said driven member, and an escapement ratchet clutch mechanism controlling the intermittent actuation of said cam.

80. In a machine of the character described, a clutch, a lever connected to said clutch, automatically operated means for throwing said lever into a position where said clutch is disengaged, a latch for holding said lever in such position, a spring normally urging said clutch into engaged position, and manually operated means for releasing said latch.

81. In a machine of the character described, a clutch including a slidable clutch member, a lever connected to said member, a tappet adapted to engage said lever to throw the same into a position where said clutch is disengaged, a latch for automatically holding said lever in such position, and a manually operated member associated with said latch for releasing the same.

82. In a machine of the character described, a clutch having a movable member, a lever connected to said member, a spring pressed plunger carried by said lever, a tappet adapted to engage said plunger to throw said lever into a position where said clutch is disengaged, and a reciprocable bar adapted when moved in one direction to swing said lever into a position where said clutch is disengaged and when moved in the opposite direction to release said clutch.

83. In a machine of the character described, a work spindle, a carriage reciprocable longitudinally thereof, a transverse slide on said carriage, a tapered thread forming hob on said slide, a rotary cam connected to said carriage and having portions for moving said hob into and out of operative relation longitudinally to the work and a portion for moving said tool during the cutting operation in accordance with the pitch to be cut, a cam connected with said cross slide and having portions for feeding the tool into and out of the work, and a portion for feeding said hob radially of the work during the cutting operation in accordance with the taper of the thread to be cut.

84. In a machine of the character described, a rotary work spindle, a thread forming tool, devices for moving said tool relative to the work during the threading operation, driving means common to said spindle and devices and including automatically operated mechanism for varying the speed of rotation thereof, and controlling means for said mechanism adapted to actuate the same during the cutting operation to change the speed of rotation of said spindle and devices.

85. In a machine of the character described, a thread forming tool, a rotary work spindle, a cam for moving said tool longitudinally during the cutting operation in accordance with the pitch to be cut, means for driving said spindle and cam at a constant ratio of speeds and including automatically operated speed controlling mechanism, and means controlling said mechanism and effective while said cam is moving said tool during the cutting operation to change the speed of rotation of said cam and spindle.

86. In a machine of the character described, a thread forming hob, a rotary work spindle, a cam for moving said hob relative to said spindle during the cutting operation, a tappet wheel provided with a plurality of adjustable tappets, and means for driving said work spindle, cam and tappet wheel and including automatically operated speed controlling mechanism, said tappets being adjustable to trip said mechanism during the cutting operation to change the speed of rotation of said spindle, cam and tappet wheel.

87. In a machine of the character described, a work spindle, a carriage reciprocable longitudinally thereof, a transverse slide on said carriage, a tool on said slide, a cam for moving said carriage to bring said tool into and out of operative relation longitudinally to the work and move said tool during the cutting operation, a cam for moving said slide to feed the tool up to and into the work after the tool has been brought into longitudinal operative relation to the work and move the tool out of the work after the cutting operation has been completed, and driving means common to said spindle and cam and including automatically operated speed controlling means effective during the cutting operation to change the speed of rotation of said spindle and cam.

88. In a machine of the character described, a clutch, a lever connected to said clutch, a spring pressed plunger carried by said lever, means adapted to engage said plunger to throw said lever into a position where said clutch is disengaged, a latch for holding said lever in such position, and a manually operable member associated with said plunger and latch for simultaneously withdrawing the plunger and to release said latch.

89. In a thread milling machine, a pair of longitudinally spaced apart rotary work holding devices, a pair of longitudinally spaced apart thread forming hobbing devices, a support on which one of said pairs of devices is mounted, and automatically operated means for moving said support with the devices thereon longitudinally of said devices, then laterally, and then longitudinally in accordance with the pitch to be cut.

90. In a thread milling machine, a pair of longitudinally spaced apart rotary work holding devices, a pair of longitudinally spaced apart thread forming hobbing devices, means driven in timed relation to said work holding devices for moving one of said pairs of devices longitudinally to bring the respective devices into and out of longitudinal relation and to move the devices relative to one another during the threading operations, and means driven in timed relation to said work holding devices for moving said longitudinally movable pair of devices laterally to bring the respective devices into operative relation.

91. In a thread milling machine, a pair of longitudinally spaced apart rotary work holding devices, a pair of longitudinally spaced apart thread forming hobbing devices, means driven in timed relation to said work holding devices for moving one of said pairs of devices longitudinally to bring the respective devices into and out of longitudinal relation and to move the devices relative to one another during the threading operations, means driven in timed relation to said work holding devices for moving said longitudinally movable pair of devices laterally to bring the respective devices into operative relation, and means for manually adjusting the devices of one pair laterally of one another.

92. In a thread milling machine, a pair of longitudinally spaced apart rotary work holding devices, a movable support, a pair of thread forming tools thereon, one for operation upon the work carried by each device, and devices driven in timed relation to said work holding devices for moving said support longitudinally and radially of the thread forming hobs.

93. In a thread milling machine, a pair of longitudinally spaced apart work holding devices adapted to carry separate pieces of work, a carriage movable longitudinally thereof, thread forming means carried by said carriage and adapted to operate upon the pieces of work carried by said spindles, means for automatically moving said thread forming devices radially of the pieces of work and in timed relation thereto, and a cam connected to said carriage for moving said thread forming means longitudinally of the work holding devices in accordance with the pitches to be cut.

BENGT M. W. HANSON.